(12) United States Patent
Hayashi et al.

(10) Patent No.: US 7,551,347 B2
(45) Date of Patent: Jun. 23, 2009

(54) OPTICAL AMPLIFICATION CHARACTERISTICS SIMULATION APPARATUS AND OPTICAL AMPLIFICATION CHARACTERISTICS SIMULATION METHOD

(75) Inventors: Etsuko Hayashi, Kawasaki (JP); Shunsuke Ono, Nagoya (JP); Setsuhisa Tanabe, Kyoto (JP); Shinichirou Muro, Kawasaki (JP); Masato Nishihara, Kawasaki (JP)

(73) Assignees: Fujitsu Limited, Kawasaki (JP); Kyoto University, Kyoto (JP)

( * ) Notice: Subject to any disclaimer, the term of this patent is extended or adjusted under 35 U.S.C. 154(b) by 0 days.

(21) Appl. No.: 11/979,370

(22) Filed: Nov. 1, 2007

(65) Prior Publication Data

US 2008/0088915 A1    Apr. 17, 2008

Related U.S. Application Data

(63) Continuation of application No. PCT/JP2005/020184, filed on Nov. 2, 2005.

(30) Foreign Application Priority Data

May 2, 2005    (JP) .............................. 2005-134415

(51) Int. Cl.
*H04B 10/17*    (2006.01)
(52) U.S. Cl. ........................ 359/333; 359/334; 359/337
(58) Field of Classification Search .......... 359/333–349
See application file for complete search history.

(56) References Cited

U.S. PATENT DOCUMENTS 5,309,530 A  *  5/1994  Bergano et al. ................ 385/1
5,309,535 A  *  5/1994  Bergano et al. ................ 385/38
5,406,410 A  *  4/1995  Hanna et al. ............. 359/341.5
5,861,981 A  *  1/1999  Jabr ........................ 359/337.1

(Continued)

FOREIGN PATENT DOCUMENTS

WO    2005/002009    1/2005

OTHER PUBLICATIONS

Masato Nishihara et al., "Characterization and new numerical model of spectral hole burning in broadband erbium-doped fiber amplifier", *IEICE Technical Report (OCS2004 39-50)*; vol. 104; No. 126; Jun. 18, 2004; pp. 49-54.

(Continued)

*Primary Examiner*—Jack W. Keith
*Assistant Examiner*—Ari M Diacou
(74) *Attorney, Agent, or Firm*—Staas & Halsey LLP

(57) ABSTRACT

In an optical amplification characteristics simulation apparatus according to the present invention, using spectrums of a signal light input to an optical amplifier and a characteristic parameter for amplification medium, gain wavelength characteristics of the amplification medium are calculated. A calculating formula for the above has a parameter corresponding to a gain fluctuation portion due to a gain spectral hole burning (GSHB) phenomenon, and this parameter is defined by a function obtained by modeling a physical phenomenon in which a population inversion rate is reduced due to the GSHB, based on that electron occupation numbers in each Stark level on the end level side are increased. Then, based on the calculated gain wavelength characteristics, the output power of the signal light is obtained, to thereby perform the optical amplification characteristics simulation on the optical amplifier. As a result, it is possible to construct a high versatile calculation model based on the physical phenomenon for the gain fluctuation due to the GSHB, to thereby simulate with high precision the optical amplification characteristics of the optical amplifier under arbitrary conditions.

17 Claims, 16 Drawing Sheets

U.S. PATENT DOCUMENTS

| | | | | |
|---|---|---|---|---|
| 6,339,495 | B1* | 1/2002 | Cowle et al. | 359/341.4 |
| 6,620,748 | B1* | 9/2003 | Sugimoto et al. | 501/64 |
| 7,076,138 | B2* | 7/2006 | Rupasov et al. | 385/122 |
| 7,212,335 | B2* | 5/2007 | Nishihara et al. | 359/341.42 |
| 2005/0254119 | A1* | 11/2005 | Nishihara et al. | 359/334 |
| 2008/0304138 | A1* | 12/2008 | Krummrich | 359/341.32 |

OTHER PUBLICATIONS

S. Ono et al., "Evaluation of the Quenching Effect on Gain Characteristics in Alumino-silicate Erbium Doped Fiber by Numerical Simulation", *Rare Earths '04* in Nara, Japan, FO-05.

S. Ono et al., "Study on Gain Spectral Hole Burning of Silica-based EDF at 77K", *The 45th Discussion of a Glass and Photonics Materials,* Nov. 2004, Japan.

S. Ono et al., "Effect or erbium ion concentration on gain spectral hole burning in silica-based erbium-doped fiber", *2005 Optical Fiber Communication Conference Technical Digest,* pp. 1-5.

Yasushi Sugaya et al., "Characterization and new numerical model of spectral hole burning in broadband erbium-doped amplifier", IEICE Technical Report, vol. 104, No. 126, pp. 49-54.

Shunsuke Ono et al., "Gain spectrum simulation for erbium doped fiber using population inversion analysis", Extended Abstracts (The 51st Spring Meeting, 2004), The Japan Society of Applied Physics and Related Societies, p. 989 only.

C. Randly Giles et al., "Modeling Erbium-Doped Fiber Amplifiers", Journal of Lightwave Technology, vol. 9, No. 2, Feb. 1991, pp. 271-283.

International Search Report (PCT/ISA/210) mailed on Jan. 17, 2006 in connection with the International Application PCT/JP2005/020184.

M. Nishihara, Y. Sugaya, and E. Ishikawa, "Characterization and new numerical model of spectral hole burning in broadband erbium-doped fiber amplifier", Proceedings of Optical Amplifiers and Their Applications, OAA 2003, Tud3, (2003).

Notification Concerning Transmittal of International Preliminary Report on Patentability in corresponding International Application No. PCT/JP2005/020184, mailed Nov. 15, 2007.

Notification of Transmittal of Translation of the International Preliminary Report on Patentability in corresponding International Application No. PT/JP2005/020184, mailed Nov. 15, 2007.

* cited by examiner

- CONFIGURATION OF OPTICAL AMPLIFIER
- CHARACTERISTIC PARAMETER FOR AMPLIFICATION MEDIUM
- PROGRAM (GSHB CALCULATION MODEL)

(A) PUMPED STATE WITHOUT SATURATING SIGNAL LIGHT (B) CASE WHERE INTERACTIONS BETWEEN IONS ARE NOT INTENSE (C) CASE WHERE TRIVALENT RARE-EARTH ION CONCENTRATION IS HIGHT AND INTERACTIONS BETWEEN IONS ARE INTENSE $Er^{3+}$:130ppm
$Al^{3+}$:73900ppm
λ sat:1530nm
Psat:0dBm
77K

FIG. 9
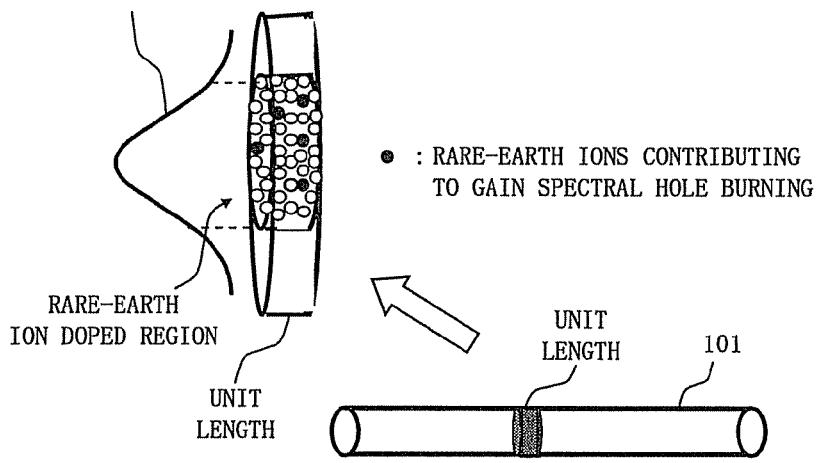
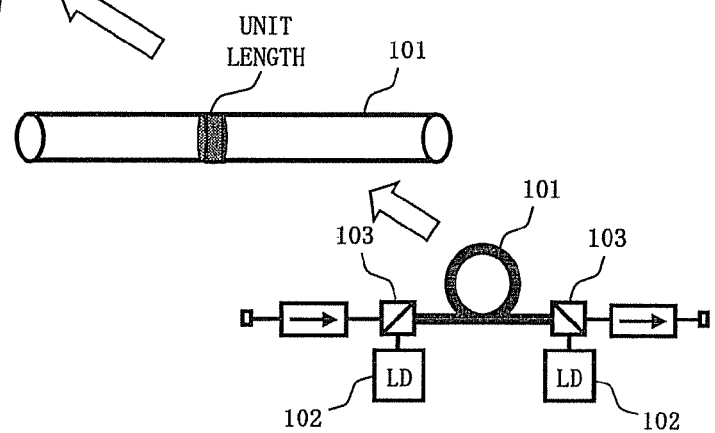
FIG. 10
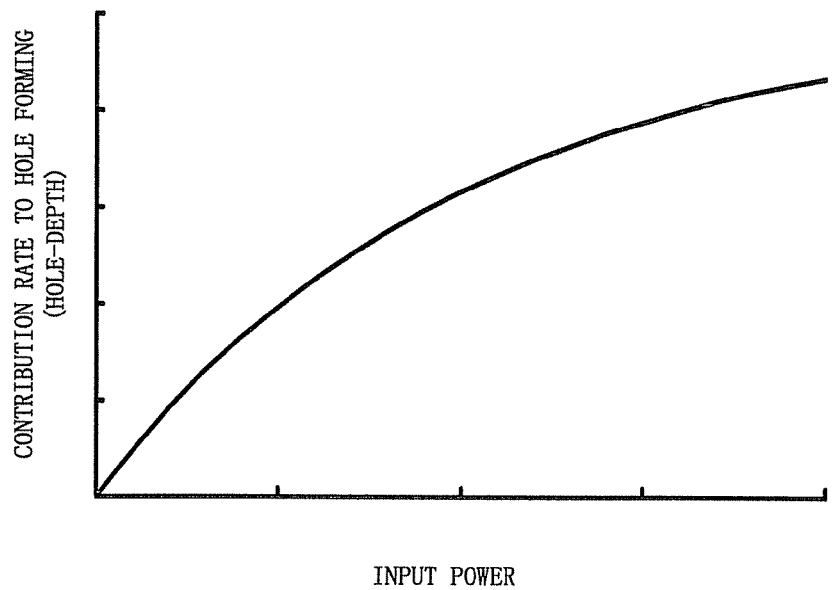

- AVERAGE GAIN : $G_{AVE}$
- REFERENCE GAIN DEVIATION : $\Delta G(\lambda)$
- CHARACTERISTIC PARAMETER
  FOR AMPLIFICATION MEDIUM
- $\Delta G_{GSHB}(\lambda)$/PROGRAM (CALCULATION OF $\Delta G_{GSHB}(\lambda)$)

FIG.25

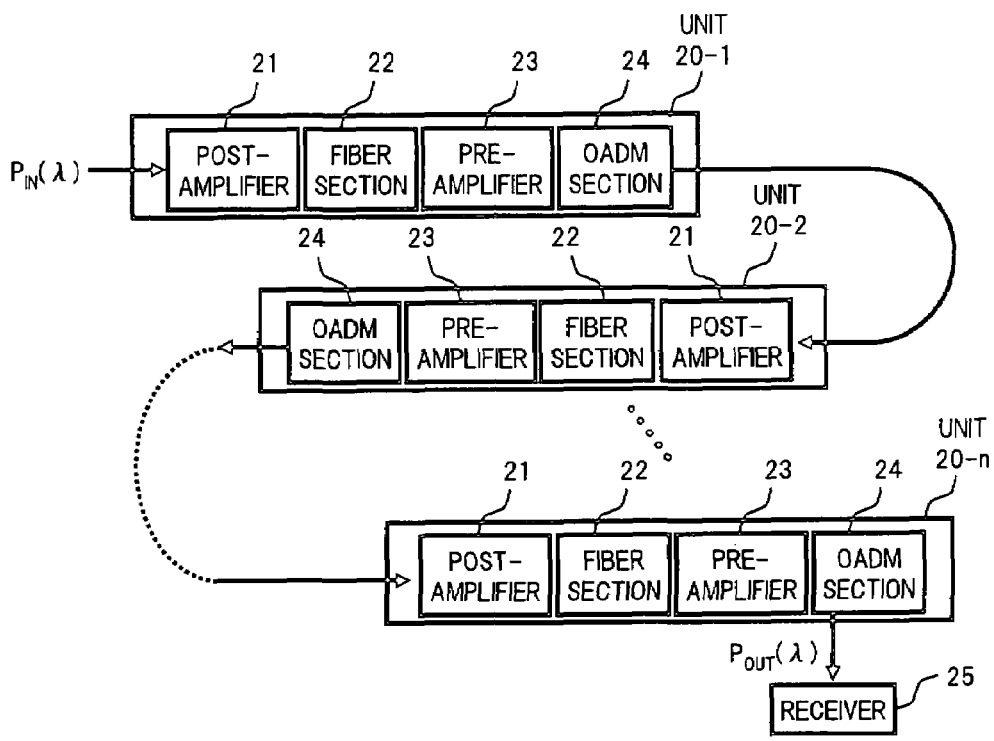

FIG.26

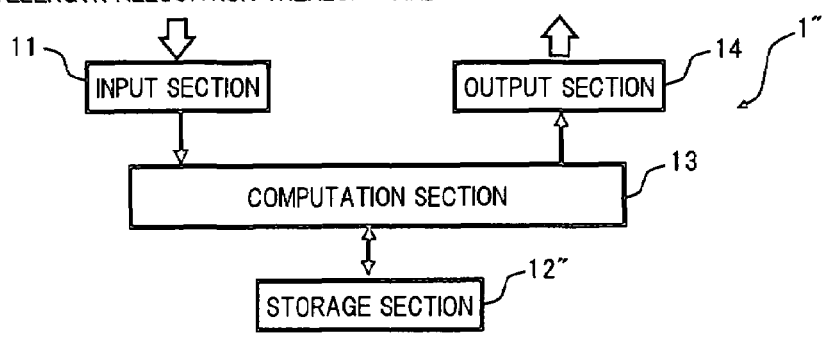

- SYSTEM CONFIGURATION
- WAVELENGTH NUMBERS OF SIGNAL LIGHT AND WAVELENGTH ALLOCATION THEREOF
- VARIATION IN RECEIVER INPUT POWER LEVEL AROUNG CHANGES IN WAVELENGTH NUMBERS AND WAVELENGTH ALLOCATION

- AVERAGE GAIN: $G_{AVE}$
- REFERENCE GAIN DEVIATION: $\Delta G(\lambda)$
- CHARACTERISTIC PARAMETER FOR AMPLIFICATION MEDIUM
- LOSS WAVELENGTH CHARACTERISTICS OF TRANSMISSION PATH AND THE LIKE, SRS OCCURRENCE AMOUNT
- FILTER CHARACTERISTICS OF OADM NODE
- PROGRAM (GSHB CALCULATING MODEL)

OPTICAL AMPLIFICATION CHARACTERISTICS SIMULATION APPARATUS AND OPTICAL AMPLIFICATION CHARACTERISTICS SIMULATION METHOD

This application is a continuation of PCT/JP2005/020184, filed on Nov. 2, 2005.

BACKGROUND OF THE INVENTION

1. Field of the Invention

The present invention relates to an apparatus and a method for simulating optical amplifying characteristics of an optical amplifier applied to an optical transmission system, and in particular, to an optical amplification characteristics simulation apparatus and an optical amplification characteristics simulation method considering the gain fluctuation due to a gain spectral hole burning phenomenon.

2. Description of the Related Art

As shown in a basic configuration diagram of FIG. 27 for example, an optical amplifier applied to a wavelength division multiplexing (WDM) optical transmission system comprises: an optical fiber (EDF) 102 doped with erbium ions ($Er^{3+}$) serving as an amplification medium; pumping light sources 102 for pumping the EDF 101; optical couplers 103 for multiplexing a signal light and a pumping light; a gain equalizer 104 for flattening a gain or an output power relative to a wavelength; and optical isolators 105 arranged on the former stage of the input side optical coupler 103 and on the latter stage of the output side optical coupler 103.

Heretofore, as shown in FIG. 28 for example, amplification characteristics of the optical amplifier as described above have been calculated by a simulation apparatus using a model in which an amplification band is regarded as one band, and wavelength characteristics are unambiguously determined according to a value of a population inversion rate which is defined by the number of ions contributing to the amplification among the total ion numbers. According to such conventional simulation, the population inversion rate is replaced with gain wavelength characteristics. Namely, there has been used the approximation in which the wavelength characteristics of the gain or the output power of the amplification medium of the optical amplifier which is automatically gain controlled is not changed even if wavelength numbers (the signal channel numbers), the wavelength allocation (the signal channel allocation) or the input power level is changed.

In recent years, there has been promoted the introduction of a WDM optical transmission system provided with nodes as shown in FIG. 29 having wavelength routing functions such as optical add/drop multiplexing (OADM), optical cross-connecting (OXC), optical hub (HUB) and the like, and accordingly, there is caused a possibility that the wavelength numbers and the wavelength allocation are significantly changed due to the wavelength routing. FIG. 30 shows a configuration example of a conventional OADM node.

In such a WDM optical transmission system, when a failure, such as the transmission path breakage or the like, occurs, measures are taken in which the line switching is made for suppressing the degradation of the service quality so that the interruption of signal transmission is suppressed to a minimum. To be specific, in the above system shown in FIG. 29, considering the case where a failure occurs in a transmission path between an OADM node #1 to which a signal light of M waves is added and an OADM node #2 to which a signal light of N waves is added, a line which transmits the signal light of M waves added at the OADM node #1 to an OADM node #n is switched from a clockwise direction to a counterclockwise direction due to the failure. In this case, if the setting of the wavelength numbers is, for example, M=39 and N=1, the wavelength numbers of the signal light sent from the OADM node #2 to an OADM node #3 are changed from 40 waves to one wave around the failure. The optical amplifier applied to each node of such a WDM optical transmission system is required to have the properties in which the wavelength characteristics of the gain or the output power are flat, even if the wavelength numbers and the wavelength allocation are significantly changed.

However, it is understood that it is hard to maintain the flatness of the gain wavelength characteristics or the output power wavelength characteristics by the conventional optical amplifier applied with the automatic gain control, and as one of the reasons thereof, it is considered a gain spectral hole burning (GSHB) phenomenon of rare-earth ions. The gain spectral hole burning phenomenon means the spectral hole burning caused by an amplification phenomenon due to the stimulated emission. For example, for the gain spectral hole burning phenomenon of an erbium-doped fiber amplifier (EDFA), it has been reported that, by controlling a pumping light for holding a gain of a signal light of 1560 nm constant, the gain spectral hole burning phenomenon can be markedly observed (refer to literature 1: M. Nishihara, Y Sugaya and E. Ishikawa, in Proceedings of Optical Amplifiers and Their Applications, OAA2003, Tud.3 (2003)).

Spectrums in the gain spectral hole burning phenomenon can be obtained by getting a difference between gain spectral which are measured by the wavelength sweep of a probe light of lower power after entering a saturating signal light (a signal light by which the gain is saturated) and the probe light into the optical amplifier and gain spectrums which are measured by the wavelength sweep of the probe light of lower power after entering only the probe light. In the difference spectrums, as shown in FIG. 31 for example, a gain difference appearing in a shape approximating a Gaussian function can be observed in the vicinity of wavelengths $\lambda 1$ to $\lambda 6$ of the saturating signal light and in the vicinity of 1530 nm thereof, and this difference spectrums are defined as the gain spectral hole burning. The gain difference appearing in Gaussian-like is called a hole, and the hole in the vicinity of the wavelengths of the saturating signal light is called a main hole and the hole in the vicinity of 1530 nm is called a second hole.

For example, in the case of a C-band (conventional band) of the EDFA, the second hole in the vicinity of 1530 nm does not depend on the wavelengths of the saturating signal light to appear at 1530 nm, and the hole-width and hole-depth thereof does not depend on the wavelengths of the saturating signal light. On the other hand, the main hole has characteristics in which the hole-width thereof is approximately constant without depending on the wavelengths of the saturating signal light whereas the hole-depth thereof becomes deeper as the wavelength of the saturating signal light becomes shorter (refer to FIG. 31). Further, in the above optical amplifier, in the case where the saturating signal light is wavelength division multiplexed, it is known that the depth of the second hole is decreased as the total input saturating signal light power is increased whereas the depth of the main hole depends on a rate between the total input saturating signal light power and the input power of each wavelength, and the saturating signal light power.

Thus, as a result that the observation of the gain spectral hole burning phenomenon has been promoted, it becomes possible to perform the simulation of the optical amplification characteristics using the calculation model thereof, and accordingly, a proposal has been made on a simulation apparatus for appropriately restricting an amplified wavelength range, an input/output power range and a gain setting range and for setting a calculating parameter, so that not only experimental results of one wave amplification characteristics but also experimental results of wavelength division multiplexing amplification characteristics can be traced (refer to literature 2: International Patent Publication 2005/002009 pamphlet).

Usually, in the optical amplifier, the length of the amplification medium and an optical circuit configuration are determined in accordance with the required specification, such as the amplification band, the input/output power range, noise characteristics and the like. Therefore, for the calculation model used in the above conventional simulation apparatus, it is also necessary to prepare the calculating parameter for the gain spectral hole burning phenomenon for each required specification.

However, in the conventional simulation apparatus, in the case where the calculating parameter setting does not meet conditions which has been set when the calculation model for the gain spectral hole burning phenomenon is constructed, a calculation result thereof does not always trace actual characteristics. In particular, in the case where the wavelength band, the temperature and the input power range are changed, it is difficult to apply the existing calculation model. Namely, the conventional simulation apparatus has disadvantages in that the calculation model without the versatility is used.

In order to enhance the versatility of the calculation model, to be specific, in order to enable the optical amplification characteristics simulation considering the gain fluctuation due to the gain spectral hole burning phenomenon even in arbitrary amplified wavelength ranges, the arbitrary wavelength numbers and wavelength allocation, arbitrary input/output power ranges, arbitrary gain ranges and arbitrary temperature ranges, it is necessary to construct a new calculation model based on a physical phenomenon. Ideally, it is desired to realize a calculation model in which the gain fluctuation due to the gain spectral hole burning phenomenon can be simulated based on a calculating parameter on the basis of the property and structure of the amplification medium.

Further, in the WDM optical transmission system as shown in FIG. 29, the number of nodes having the wavelength routing functions tends to increase, and as a result, the number of optical amplifiers used in the system are increased. In each optical amplifier, in the case where the wavelength numbers of the signal light and the wavelength allocation thereof are significantly changed as described in the above (for example, from 40 waves to one wave, and the like), as shown in the time-dependence of the power change of the residual signal light in FIG. 32, immediately after the changes of the wavelength numbers and the wavelength allocation, there occurs a phenomenon called an optical surge in which an output power level is instantaneously changed to be increased. The optical surge occurring when the wavelength numbers are changed can be suppressed by taking measures, such as the application of a high-speed automatic gain control (high-speed AGC) system. After the control for the optical surge suppression is stabled, there occurs the output power deviation in which the output power level per one wave is increased or decreased relative to a state before the wavelength numbers are changed. The above gain reduction due to the gain spectral hole burning phenomenon is one factor of the output power deviation after the optical surge suppression. To such output power deviation, a required output power level is maintained by performing an automatic level control utilizing a variable optical attenuator incorporated in the wavelength routing device.

However, generally, it takes several milliseconds or several ten milliseconds until the variable optical attenuator to be utilized for the automatic level control is operated. The above described output power fluctuation which occurs until the automatic level control is effectively performed is accumulated in each optical amplifier disposed on the system, and an accumulative amount thereof is increased as the disposed number of optical amplifiers is increased. Therefore, it is anticipated that the transmission quality is degraded due to the optical output power fluctuation or the optical signal-to-noise (SN) ratio fluctuation.

Thus, in order to ensure the reliability of the optical transmission system, it is necessary to consider the optical output power fluctuation and the optical SN ratio fluctuation. However, there is a problem in that the analysis or the cause clarification has not been sufficiently performed on a phenomenon called the above output power deviation and the accumulation thereof. Namely, heretofore, only the gain spectral hole burning phenomenon of the optical amplifier has been noticed as the cause of the output power deviation, and accordingly, for the simulation thereof, the above described problem is not still solved. In particular, in the conventional simulation apparatus, the detailed design information, such as the optical circuit configuration of the optical amplifier, the pumping control method and the like, is required. Optical parts configuring the optical amplifier are often provided from external parts manufacturer. In such a case, it is difficult for a system designer to obtain the detailed design information of the optical amplifier, and consequently, it becomes hard to make a design considering the optical output power fluctuation and the optical SN ratio fluctuation on the total optical transmission system.

SUMMARY OF THE INVENTION

The present invention has been accomplished in view of the above problems, and has an object to provide an apparatus and a method capable of constructing a high versatile calculation model for the gain fluctuation due to the gain spectral hole burning phenomenon based on a physical phenomenon to thereby simulate with high precision optical amplification characteristics of an amplification medium under arbitrary conditions. Further, the present invention has an object to apply the above calculation model, to thereby enable the precise simulation of transmission characteristics of a WDM optical transmission system.

In order to achieve the above objects, an optical amplification characteristics simulation apparatus of the present invention is for supplying a pumping light to an amplification medium which is doped with rare-earth ions, and simulating optical amplification characteristics of the amplification medium, which amplifies a signal light input thereto due to a stimulated emission phenomenon of the pumped rare-earth ions to output the amplified signal light. This optical amplification characteristics simulation apparatus comprises: an input section that receives information relating to the signal light input to the amplification medium; a storage section that stores therein information relating to at least characteristics of the amplification medium; a computation section that uses the information input to the input section and the information stored in the storage section, to calculate gain wavelength characteristics, inclusive of a gain fluctuation portion due to a gain spectral hole burning phenomenon, of the amplification medium, in accordance with a previously set calculating formula, and obtains the power of the signal light output from the amplification medium based on the calculated gain wavelength characteristics, to thereby simulate the optical amplification characteristics of the amplification medium; and an output section that outputs the simulation result in the computation section. Further, the calculating formula used in the computation section is characterized to have a parameter corresponding to the gain fluctuation portion due to the gain spectral hole burning phenomenon, and this parameter is characterized to be defined with a function obtained by modeling a physical phenomenon in which a population inversion rate is reduced due to the gain spectral hole burning phenomenon, based on that, in an energy level structure of the amplification medium having Stark levels which are split into J+½ or 2J+1 relative to the total quantum numbers J due to Coulomb interactions, the spin-orbit interaction and the Stark effect, electron occupation numbers of each Stark level on the end level side are increased.

According to an optical amplification characteristics simulation method of the present invention, for an optical amplifier which supplies a pumping light to an amplification medium doped with rare-earth ions and amplifies a signal light input to the amplification medium due to a stimulated emission phenomenon of the pumped rare-earth ions to output the amplified signal light, gain wavelength characteristics, inclusive of a gain fluctuation portion due to a gain spectral hole burning phenomenon, of the optical amplifier are calculated, in accordance with a previously set calculating formula using information relating to the signal light input to the optical amplifier and information relating to characteristics of the amplification medium, or a gain change amount due to the gain spectral hole burning phenomenon which occurs at the optical amplification time in previously set wavelength numbers and the previously set wavelength allocation is obtained by previously measuring characteristics of the optical amplifier, to calculate optical amplification characteristics of the optical amplifier based on the calculated or obtained gain wavelength characteristics. In this optical amplification characteristics simulation method, the calculating formula used for the calculation of the gain wavelength characteristics of the optical amplifier is characterized to have a parameter corresponding to the gain fluctuation portion due to the gain spectral hole burning phenomenon, and this parameter is characterized to be defined with a function obtained by modeling a physical phenomenon in which a population inversion rate is reduced due to the gain spectral hole burning phenomenon, based on that, in an energy level structure of the amplification medium having Stark levels which are split into J+½ or 2J+1 relative to the total quantum numbers J due to the Stark effect, electron occupation numbers of each Stark level on the end level side are increased.

In the optical amplification characteristics simulation apparatus and the optical amplification characteristics simulation method as described above, the gain wavelength characteristics of the amplification medium are calculated in accordance with the previously set calculating formula, using the information relating to the signal light input to the amplification medium of the optical amplifier and the information relating to the characteristics of the amplification medium. For the calculating formula used at this time, a new calculation model for the gain fluctuation due to the gain spectral hole burning phenomenon is applied. This calculation model is obtained by modeling the physical phenomenon in which the population inversion rate is reduced due to the gain spectral hole burning phenomenon, based on that, in the energy level structure of the amplification medium having Stark levels which are split into J+½ or 2J+1 relative to the total quantum numbers J due to Coulomb interactions, the spin-orbit interaction and the Stark effect, the electron occupation numbers of each Stark level on the end level side are increased, and the parameter defined by the function corresponding thereto is incorporated into the calculating formula. Then, based on the calculated gain wavelength characteristics of the amplification medium, the power of the signal light output from the amplification medium is obtained, so that the optical amplification characteristics of the optical amplifier are simulated.

Further, the present invention also provides an apparatus for simulating transmission characteristics of a wavelength division multiplexing optical transmission system in which a plurality of devices each having a wavelength routing function and a plurality of optical amplifiers are arranged on a transmission path. This transmission characteristics simulation apparatus comprises: an input section that receives information relating to a configuration of the wavelength division multiplexing optical transmission system and information relating to a signal light transmitted through the wavelength division multiplexing optical transmission system; a storage section that stores therein information relating to characteristics of amplification mediums of the optical amplifiers, loss wavelength characteristics relating to the transmission path and filter characteristics of the devices each having the wavelength routing function; a computation section that, for an optical amplifier set on a simulation starting point, uses the information input to the input section and the information stored in the storage section to calculate gain wavelength characteristics of the optical amplifier, inclusive of a gain fluctuation portion due to a gain spectral hole burning phenomenon, in accordance with a previously set calculating formula, or obtains a gain change amount due to the gain spectral hole burning phenomenon which occurs at the amplification time in previously set wavelength numbers and the previously set wavelength allocation by previously measuring characteristics of the optical amplifier, and after obtaining the power of the signal light output from the optical amplifier based on the calculated or obtained gain wavelength characteristics, repetitively executes, a series of computation processing of calculating the power of the signal light input to the next stage optical amplifier according to the loss wavelength characteristics of the transmission path or the filter characteristics of the device having the wavelength routing function which are connected to the latter stage of the optical amplifier, up to the optical amplifier connected to a reception end, to thereby simulate transmission characteristics of the signal light which reaches the reception end; and an output section that outputs the simulation result of the computation section. Further, the calculating formula used for the calculation of the gain wavelength characteristics of the optical amplifier in the computation section is characterized to have a parameter corresponding to the gain fluctuation portion due to the gain spectral hole burning phenomenon, and this parameter is characterized to be defined with a function obtained by modeling a physical phenomenon in which a population inversion rate is reduced due to the gain spectral hole burning phenomenon, based on that, in an energy level structure of the amplification medium having Stark levels which are split into J+½ or 2J+1 relative to the total quantum numbers J due to Coulomb interactions, the spin-orbit interaction and the Stark effect, electron occupation numbers of each Stark level on the end level side are increased.

In the above transmission characteristics simulation apparatus as described above, similarly to the above optical amplification characteristics simulation apparatus for the optical amplifier, the signal light output power of each optical amplifier arranged on the transmission path of the wavelength division multiplexing optical transmission system is calculated in accordance with the calculating formula applied with the new calculation model for the gain fluctuation due to the gain spectral hole burning phenomenon. At this time, for the signal light input to the next stage optical amplifier from the former stage optical amplifier via the transmission path or the device having the wavelength routine function, the input power thereof is calculated according to the loss wavelength characteristics of the transmission path or the filter characteristics of the device having the wavelength routing function. Such computation processing is repetitively executed on the optical amplifier set on the simulation starting point up to the optical amplifier connected to a receiver, so that the transmission characteristics of the signal light reaching the reception end can be simulated.

According to the optical amplification characteristics simulation apparatus and the optical amplification characteristics simulation method of the present invention as described in the above, since the gain wavelength characteristics of the amplification medium are calculated for the gain fluctuation due to the gain spectral hole burning phenomenon by applying the high versatile calculation model based on the physical phenomenon, it becomes possible to simulate with high precision the optical amplification characteristics considering the gain fluctuation due to the gain spectral hole burning phenomenon under arbitrary conditions. Further, by applying the above calculation model to the simulation of the transmission characteristics of the WDM optical transmission system, it is possible to calculate with high precision the output power deviation of the optical amplifier which occurs due to the gain spectral hole burning phenomenon and the like and the accumulation of the output power deviation. Therefore, it becomes possible to precisely simulate the transmission characteristics of the WDM optical transmission system. Furthermore, by previously measuring the gain fluctuation portion due to the gain spectral hole burning phenomenon of the optical amplifier, it becomes possible to simulate the transmission characteristics of the WDM optical transmission system which uses optical amplifiers of unspecified optical circuit configurations.

The other objects, features, advantages and various aspects of the present invention will become more apparent from the ensuing description of preferred embodiments with reference to the accompanying drawings.

BRIEF DESCRIPTION OF THE DRAWING

FIG. 9 is a diagram for explaining that a part of rare-earth ions in an amplification medium contributes to the hole forming.

FIG. 10 is a graph showing the input power dependence for a rate of the rare-earth ions which contribute to the gain spectral hole burning phenomenon.

FIG. 25 is a diagram showing one example of simulation model in the case where transmission characteristics of an optical transmission system which uses optical amplifiers are simulated by applying the present invention.

FIG. 26 is a block diagram showing a configuration example of a simulation apparatus corresponding to the optical transmission system, to which the simulation model in FIG. 25 is applied.

DESCRIPTION OF THE PREFERRED EMBODIMENTS

Figure 1:
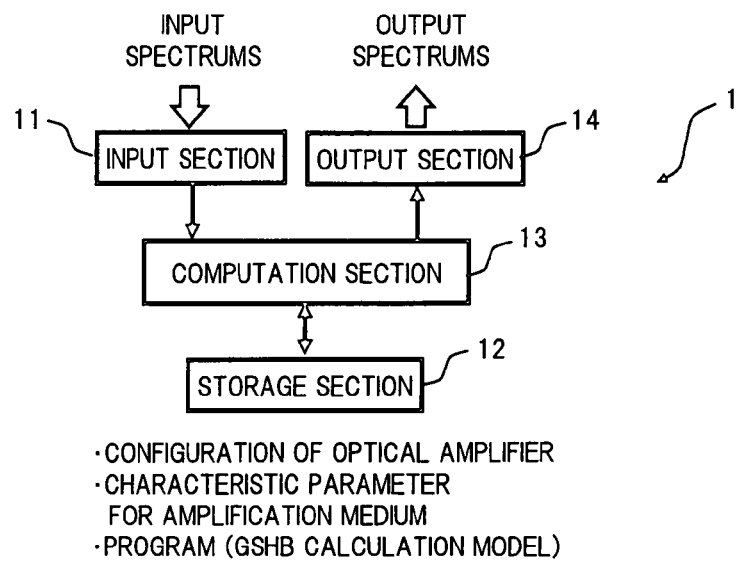
FIG. 1 is a block diagram showing a configuration of one embodiment of an optical amplification characteristics simulation apparatus according to the present invention.

There will be described embodiments for implementing the present invention, with reference to the accompanying drawings. The same reference numerals denote the same or equivalent parts in all drawings.

FIG. 1 is a block diagram showing a configuration of one embodiment of an optical amplification characteristics simulation apparatus according to the present invention.

In FIG. 1, the optical amplification characteristics simulation apparatus 1 in the present embodiment comprises, for example, an input section 11, a storage section 12, a computation section 13 and an output section 14. The input section 11 receives information relating to spectrums of a signal light input to an optical amplifier which is an objective of the simulation. The storage section 12 stores therein, as information relating to a configuration of an optical amplifier, data of a pumping light wavelength, the length of an amplification medium, a loss in a constituent optical part, a pumping light control method and the like, and as characteristic parameters for the amplification medium, data of the rare-earth ion concentration, the glass composition of a fiber and the like. Further, the storage section 12 stores therein a program for executing the optical amplification characteristics simulation. The computation section 13 is made up by a CPU (Central Processing Unit) and the like, and executes the optical amplification characteristics simulation using a calculation model (to be described later) of a gain spectral hole burning phenomenon in accordance with the program stored in the storage section 12. The output section 14 outputs the simulation result in the computation section 13 to the outside.

Here, there will be described in detail the calculation model of the gain spectral hole burning phenomenon, which is to be applied to the present optical amplification characteristics simulation apparatus 1.

In order to solve the problems relating to the conventional optical amplification characteristics simulation apparatus as described in the above, it is necessary to seek origins of the gain spectral hole burning phenomenon to thereby perform the research going back to a physical phenomenon. By physically clarifying the gain spectral hole burning phenomenon, it becomes possible to clear up a causal relation between the gain spectral hole burning phenomenon, and property and structure parameters of the amplification medium, to thereby solve the problems in the conventional technology.

Figure 2:
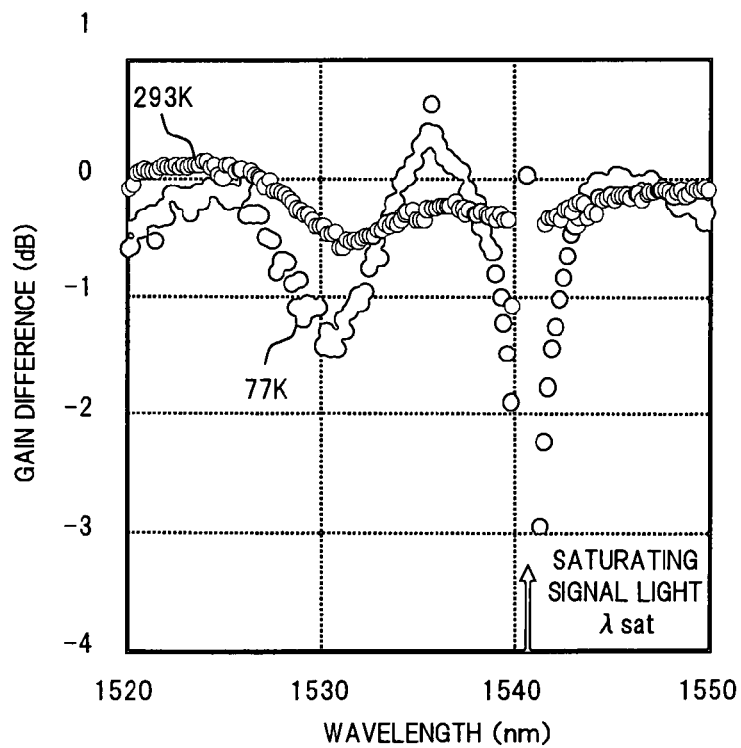
FIG. 2 is a graph showing one example of spectrums of a gain spectral hole burning phenomenon which are measured at the room temperature and at the low temperature.

It is known that, in the gain spectral hole burning phenomenon, the hole-width is changed depending on the temperature. By observing the gain spectral hole burning at the low temperature, it is possible to reveal the gain spectral hole burning which eliminates an influence by the heat fluctuation. FIG. 2 is a graph showing one example of spectrums in the gain spectral hole burning phenomenon, which are measured at the room temperature (for example, 293K) and the low temperature (for example, 77K). From FIG. 2, it is understood that a main hole and a second hole appear in same wavelengths at the room temperature and the low temperature, and the depth of each hole is deeper at the low temperature than that at the room temperature, and therefore, the influence by the heat fluctuation is reduced. Note, as the measuring method, the method recited in the above described literature 1 is used.

Figure 3:
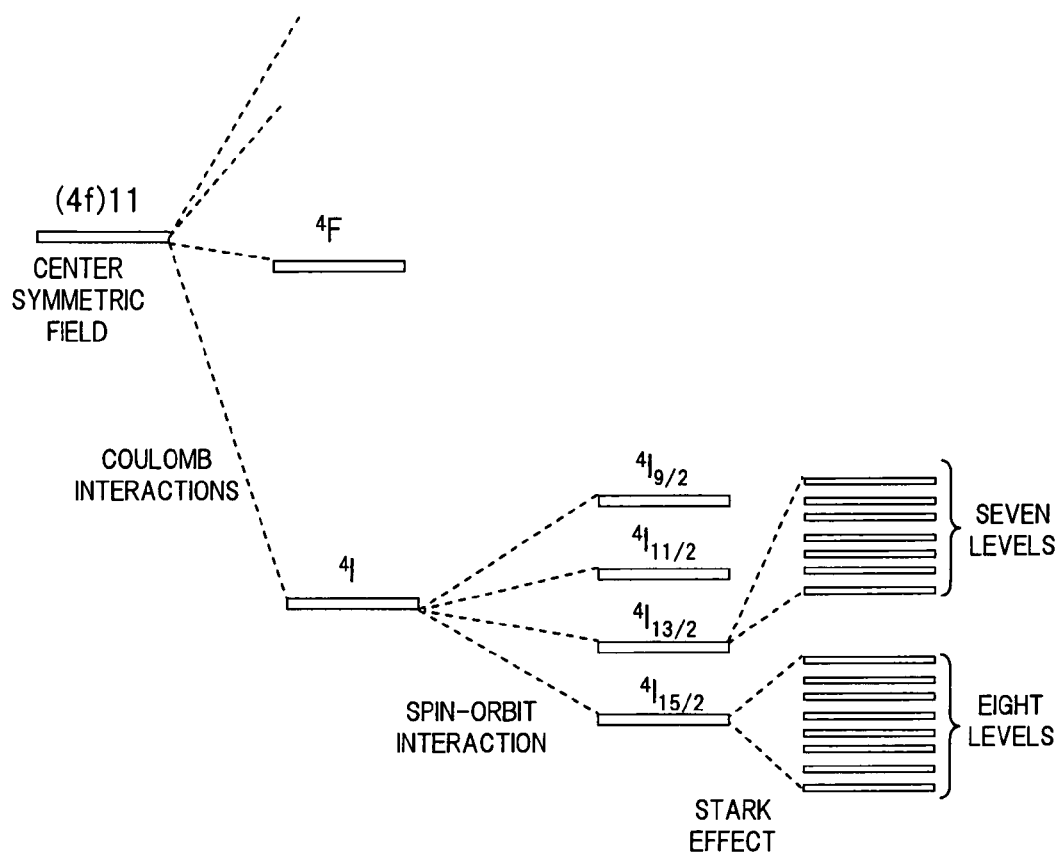
FIG. 3 is a diagram showing a level structure of erbium ions.

Trivalent rare-earth ions form an energy level structure with Coulomb interactions, the spin-orbit interaction, and an absorption property and an emission property appear due to the electron transitions between energy levels of the energy level structure. Further, it is known that the respective levels have Stark levels which are split into J+½ for the case where 4f electron numbers are odd numbers and into 2J+1 for the case where the 4f electron numbers are even numbers, due to the Stark effect. Note, J indicates the total quantum numbers. As a specific example, FIG. 3 shows a level structure of erbium ions ($Er^{3+}$).

The emission property of trivalent rare-earth ions and the absorption property thereof are basically determined with the overlap of the transitions between Stark levels. It is considered that, at the low temperature such as 77K, about 80% of the electrons pumped into a starting level occupies a first level and a second level (a first and a second from the bottom in Stark level are called the first level and the second level, respectively) in accordance with Boltzmann distribution. Therefore, the emission spectrums are observed due to the transitions from the first and second levels of the starting level ($^4I_{13/2}$ in FIG. 3) to each Stark level of an end level ($^4I_{15/2}$ in FIG. 3). An optical amplification phenomenon is realized due to a stimulated emission phenomenon by selectively using the transition between certain Stark levels, in the case where the population inversion rate is formed between the starting level of the total quantum number level and the end level thereof and a light of certain wavelengths is amplified. Many of trivalent rare-earth ions behave like a single-band due to the uneven spread. However, the present invention newly adopts a model in which the transition between Stark levels, in which a part of rare-earth ions is evenly spread, dominantly acts on the optical amplification so that the gain spectral hole burning phenomenon occurs. At this time, it is provided that the spectral line width in the gain spectral hole burning phenomenon is sufficiently narrower than the line width of the emission spectrums of uneven spread.

Figure 31:
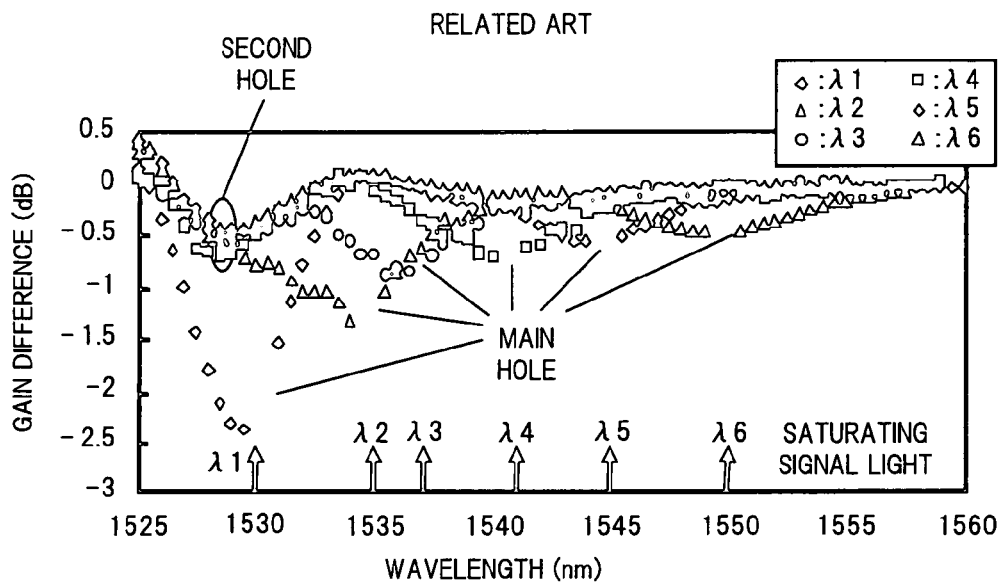
FIG. 31 is a graph showing spectrums in the gain spectral hole burning phenomenon according to wavelengths of a saturating signal light.

In accordance with the above model, it is possible to deem the gain spectral hole burning phenomenon shown in FIG. 31 or FIG. 2 as a gain reduction phenomenon due to the transitions between Stark levels. The gain reduction, that is, the reduction of the population inversion rate, occurs only when the electron occupation numbers in the starting level are decreased or the electron occupation numbers in the end level are increased.

Figure 4:
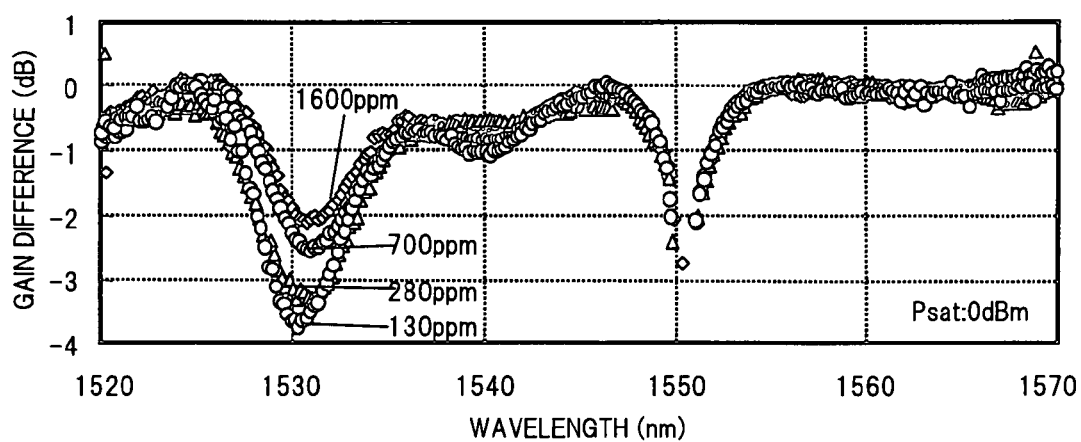
FIG. 4 is a graph showing a change in hole-depth due to a difference between doped amounts of rare-earth ions.

It is possible to judge whether the reduction of the population inversion rate is caused by the decrease of the electron occupation numbers in the starting level or by the increase of the electron occupation numbers in the end level, by observing a change in the hole-depth due to a difference between doped amounts of the rare-earth ions as shown in FIG. 4 for example. Namely, from FIG. 4, it is understood that the hole-depth becomes less as the rare-earth ions concentration is increased. It is considered that such a change in the hole-depth is caused by a fact that, as the rare-earth ion concentration is increased so that a distance between the rare-earth ions is reduced, the electrons which have been consumed for the hole forming are covered with interactions between the rare-earth ions.

Figure 5:
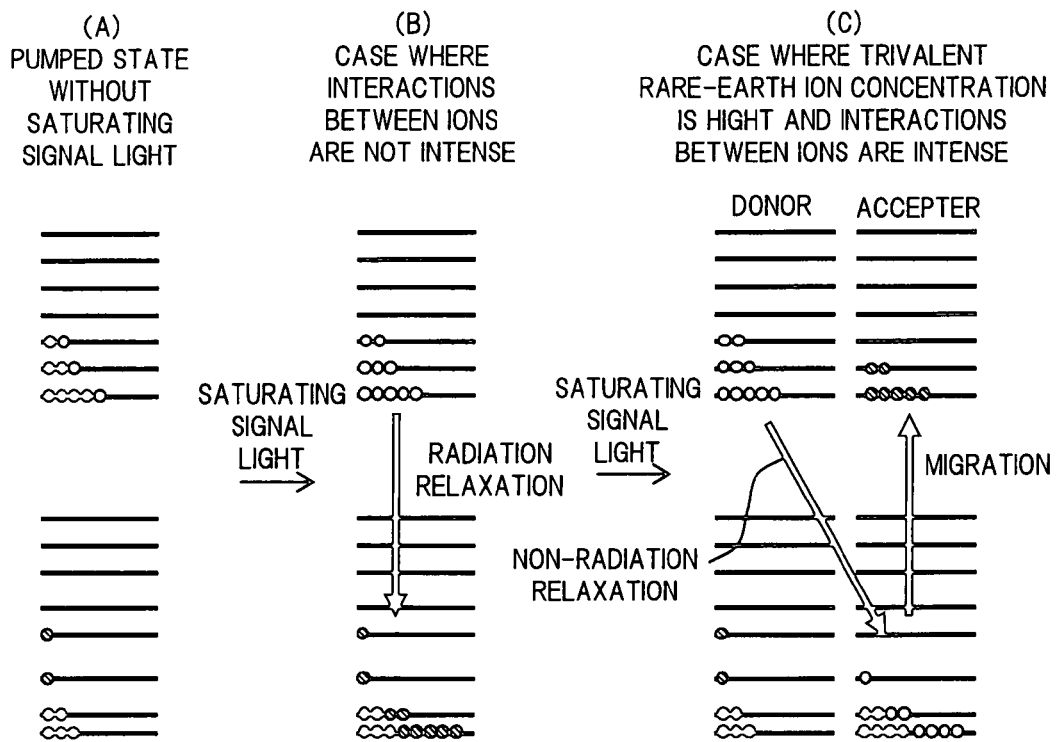
FIG. 5 is a conceptual diagram for explaining a mechanism of covering electrons which have been consumed for the hole forming, with interactions between the rare-earth ions.

Briefly explaining the above covering mechanism using a conceptual diagram of FIG. 5, in the case where the rare-earth ion concentration is relatively low and the interactions between ions are not intense in a pumping state as shown in (A) of FIG. 5, the electrons in the starting level transit into the end level due to the radiation relaxation by the input of a saturating signal light as shown in (B) of FIG. 5, so that the electron occupation numbers in the end level are increased. Contrary to this, in the case where the interactions between ions become intense as the rare-earth ion concentration is increased as shown in (C) of FIG. 5, it is considered that the electrons in the starting level transit into the end level due to the non-radiation relaxation in the non-radiation processing, and also, there occurs migration in which the electrons in the end level transit into the starting level.

Accordingly, the present invention applies to the calculation model the consideration in that the reduction of the population inversion rate between Stark levels, which is deemed to be the physical cause of the gain spectral hole burning phenomenon, is caused by the increase of the electron occupation numbers in the end level.

Figure 6:
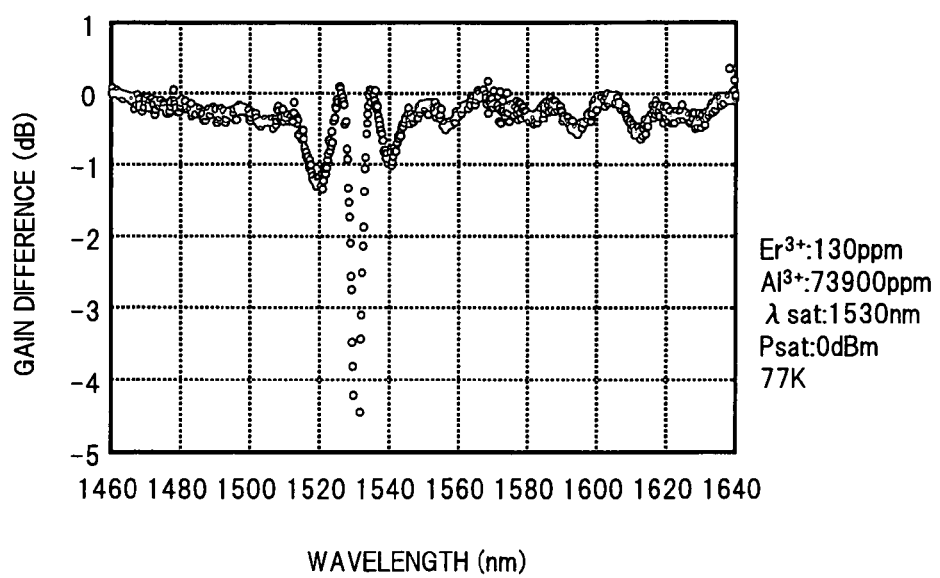
FIG. 6 is a graph showing that a sub-hole is formed, in a measuring result of the gain spectral hole burning phenomenon at the low temperature.

Further, for the gain spectral hole burning phenomenon, as shown in a measurement result at 77K shown in FIG. 6, not only the main hole and the second hole but also a plurality of shallow holes having a peak at each 10 nm interval (to be referred to as sub-holes hereunder) are observed. It is considered that these sub-holes are formed corresponding to combinations of transitions between Stark levels occupied by the electrons on the starting level side and each Stark level on the end level side.

Figure 7:
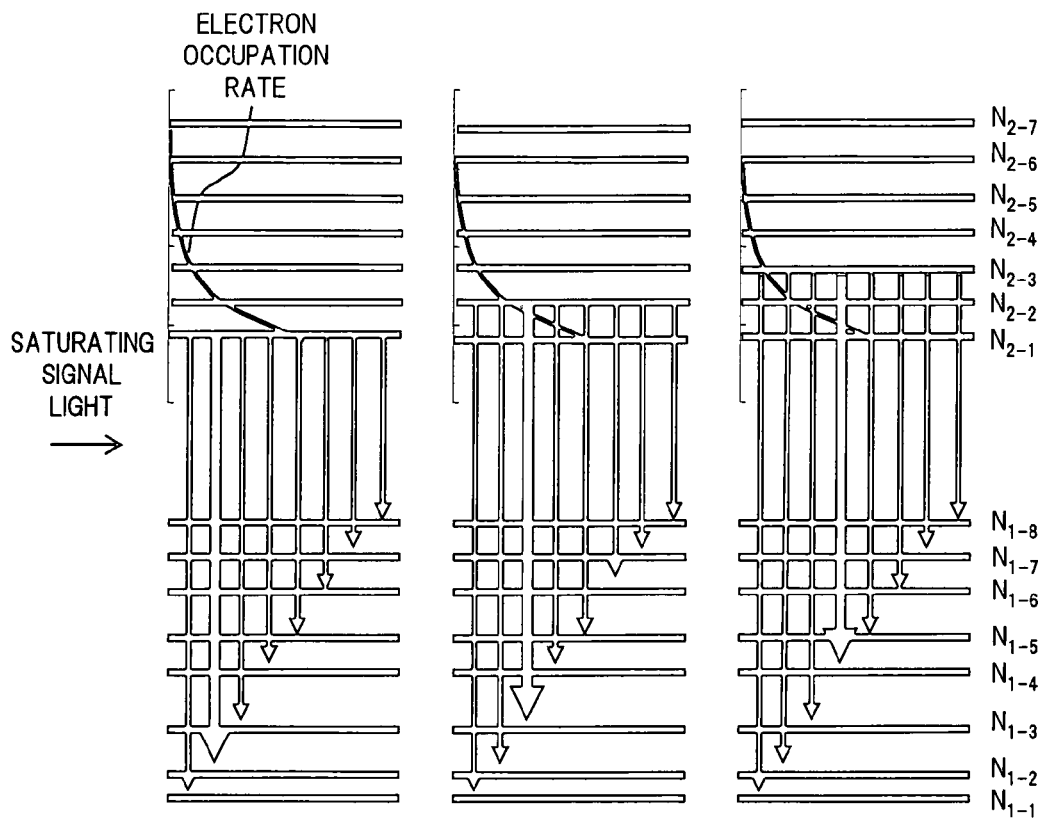
FIG. 7 is a diagram exemplarily showing combinations of transitions between Stark levels.

Namely, as shown in FIG. 7 for example, the electrons contributing to the amplification of the saturating signal light among the electrons occupying the respective Stark levels $N_{2-1}, N_{2-2}, N_{2-3}, \ldots$ on the starting level side are relaxed to be de-excited to Stark levels $N_{1-2}, N_{1-3}, N_{1-4}, \ldots$ on the end level side, each having an energy level difference corresponding to a wavelength of the saturating signal light, as shown by bold arrow lines in the figure. Therefore, the population inversion rate between Stark levels on the starting level side and Stark levels on the end level side is reduced by the decrease of the electron occupation numbers on the starting level side, so that the sub-holes corresponding to the respective transitions shown by thin arrow lines are formed.

Figure 8:
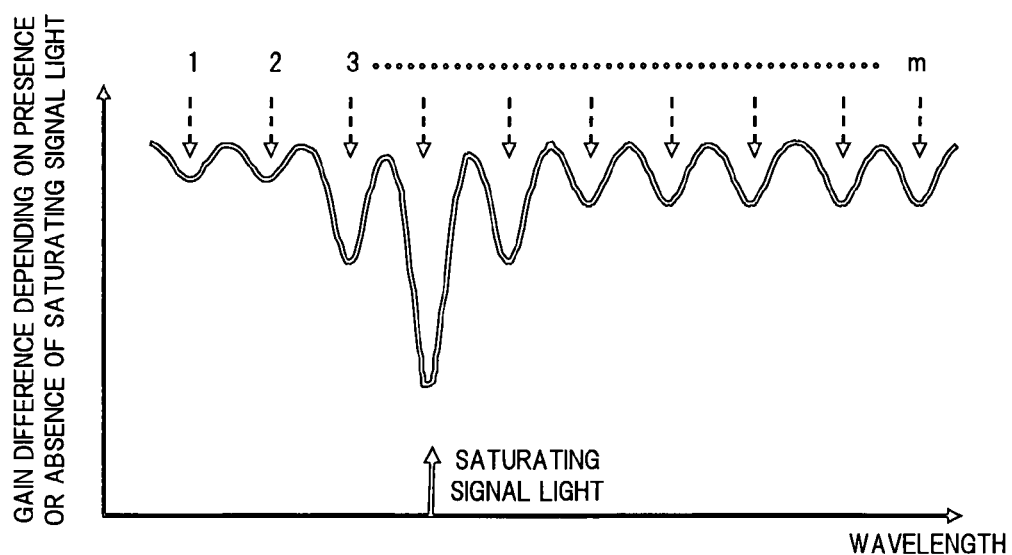
FIG. 8 is a graph showing that the sub-hole is formed corresponding to the combinations of transitions between Stark levels.

Accordingly, the present invention applies to the calculation model the consideration in that the number of holes formed due to the gain spectral hole burning phenomenon is determined by the combinations of the transitions between Stark levels which are occupied by the electrons on the starting level side and Stark levels on the end level side, as shown in FIG. 8.

Furthermore, for the gain spectral hole burning phenomenon, as shown in FIG. 9 for example, a part of the rare-earth ions in the amplification medium contributes to the hole forming. It is newly understood from the above described observation of the gain spectral hole burning phenomenon that a rate of the rare-earth ions contributing to the gain spectral hole burning phenomenon (sometimes, called a contribution rate to the hole forming, hereunder) depends on the input power, the total population inversion rate, the rare-earth ion concentration, and a propagation mode of the signal light in the amplification medium, and also, it is understood that the temperature dependence of the hole-width in the gain spectral hole burning phenomenon is different from the conventionally reported temperature dependence of the hole-width of the spectral hole burning.

Figure 11:
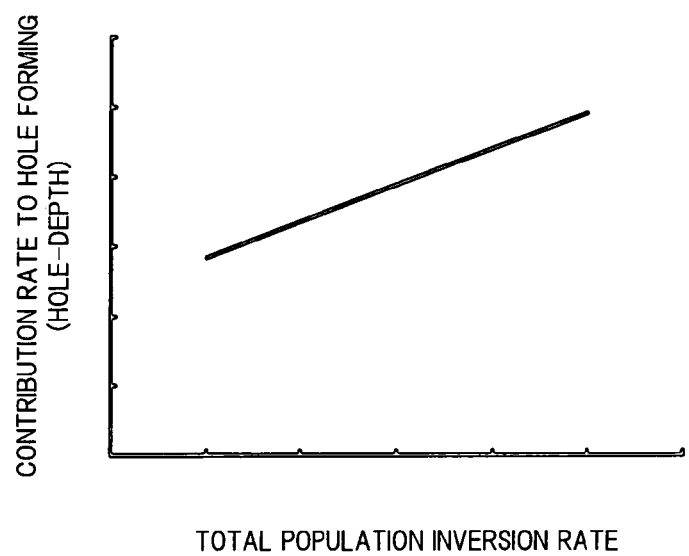
FIG. 11 is a graph showing the total population inversion rate dependence for the rate of the rare-earth ions which contribute to the gain spectral hole burning phenomenon.

To be specific, the dependence on the input power has a characteristic such that as the input power becomes higher, the contribution rate to the hole forming becomes higher, as shown in FIG. 10. Further, for the dependence on the total population inversion rate, as the total population inversion rate becomes higher, the contribution rate to the hole forming tends to become higher, as shown in FIG. 11. Incidentally, the total population inversion rate means a ratio of the rare-earth ion numbers providing the electrons which participate in the stimulated emission transition, to the total rare-earth ion numbers in the amplification medium.

Figure 12:
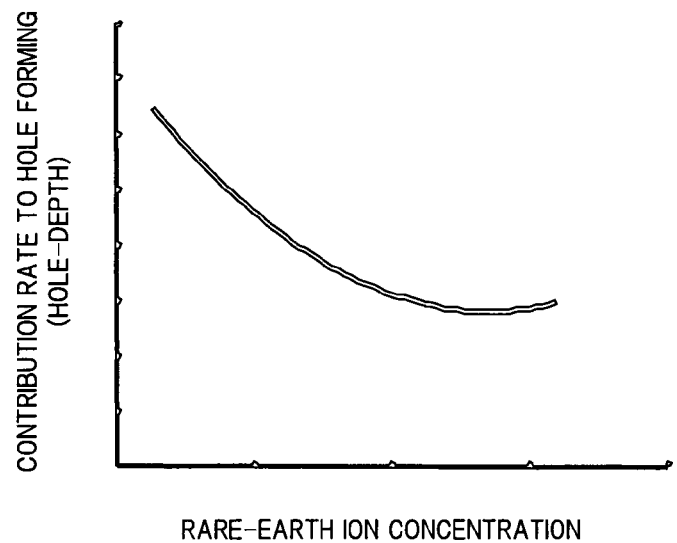
FIG. 12 is a graph showing the concentration dependence for the rate of the rare-earth ions which contribute to the gain spectral hole burning phenomenon.

The dependence on the rare-earth ion concentration has a characteristic such that as the rare-earth ion concentration becomes higher, the contribution rate to the hole forming becomes lower, as shown in FIG. 12.

Furthermore, for the dependence on the propagation mode of the signal light in the amplification medium, as the power of the signal light incident per one rare-earth ion in the amplification medium becomes higher or as an integral value of the signal light power in a region doped with the rare-earth ions in the amplification medium becomes higher, the contribution rate to the hole forming tends to become higher.

Figure 13:
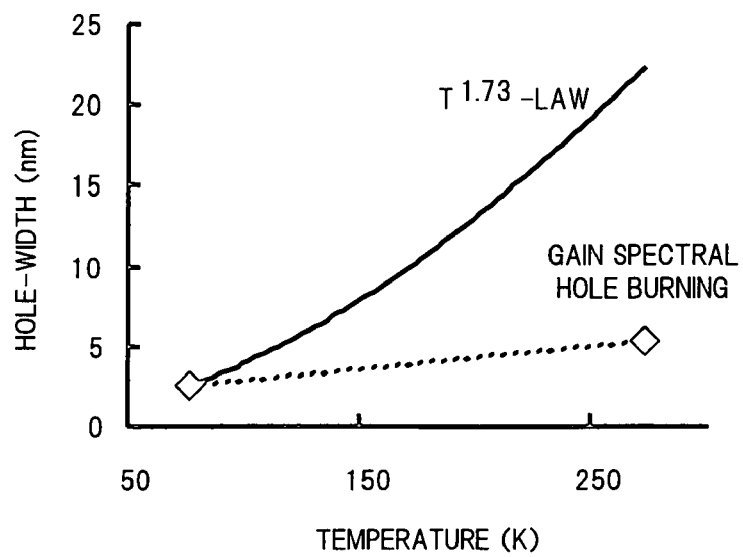
FIG. 13 is a graph showing the temperature dependence of the hole-widths in the gain spectral hole burning phenomenon and a spectral hole burning phenomenon.

Moreover, for the gain spectral hole burning observed in a state where the population inversion rate is not formed, it has been reported that the hole-width follows $T^{1.73}$ (T: temperature) (refer to the literature 3: E. Desurvire et al., IEEE Photonics Technology Letters, vol. 2, No. 4 (1990) pp. 246 to 248). In this literature 3, the hole-width is in proportional to $T^{1.73}$ in a temperature range of 20 to 77K. Contrary to this, the gain spectral hole burning phenomenon observed in a state where the population inversion rate is formed has a characteristic such that a change amount of the hole-width due to the temperature becomes smaller compared with the dependence ($T^{1.73}$-law) of the hole-width in the state where the population inversion rate is not formed, as shown in FIG. 13 for example.

Consequently, the present invention applies to the calculation model the consideration in that in addition to the dependence of the hole-width of the gain spectral hole burning phenomenon on the temperature, the contribution rate to the hole forming depends on at least one of the input power, the total population inversion rate, the rare-earth ion concentration and the propagation mode of the signal light in the amplification medium.

Next, there will be specifically described a simulation method of the optical amplification characteristics using the calculation model based on the above considerations.

For example, considering a unit length $\Delta z$ of the amplification medium doped with the rare-earth ions with a longitudinal direction of the amplification medium as a z-axis direction (refer to FIG. 9), if a change amount of the population inversion rate causing the gain fluctuation due to the gain spectral hole burning phenomenon is $\Delta n_{GSHB}$ in the case where the signal light is propagated through the unit length $\Delta z$, the signal light power $P(z+\Delta z)$ in the unit length $\Delta z$ can be expressed by the next formula (1).

$$P(z+\Delta z)=P(z)+G(n+\Delta n_{GSHB})\times P(z) \tag{1}$$

Note, n in the above formula (1) is the population inversion rate in the coordinate z of the amplification medium, P(z) is the signal light power in the coordinate z of the amplification medium, and G(n) is a gain of the amplification medium in the case of the population inversion rate n.

A propagation equation of the signal light which is propagated through the amplification medium can be expressed by the next formula (2).

$$dP(z,\lambda)/dz=\{(g(\lambda)+\alpha(\lambda))(n(z)+\Delta n_{GSHB})-(\alpha(\lambda)+l(\lambda))\}\times P(z,\lambda) \tag{2}$$

In the above formula (2), the population inversion rate n is a function n(z) according to the coordinate z in the longitudinal direction of the amplification medium. Further, g(λ) in the above formula (2) is a gain coefficient in the amplification medium, α(λ) is an absorption coefficient, l(λ) is a loss, which are previously given as functions according to a wavelength λ of the signal light. Incidentally, herein, data relating to g(λ), α(λ) and l(λ) is compiled in a database in the storage section 12 as a characteristic parameter for the amplification medium.

Based on the above formula (2), a minimum change amount dP(z)/dz of the signal light power in the coordinate z of the amplification medium can be obtained by obtaining the signal light power P(z) and n(z)+Δ$n_{GSHB}$ in the coordinate z. Based on the signal light power P(z) in the coordinate z of the amplification medium, n(z) can be obtained by a known calculating formula (refer to the formula (14) in the literature 4: C. R. Giles, et al., "Modeling Erbium Doped Fiber Amplifiers", IEEE Journal of Lightwave Technology., pp. 271 to 283, vol. 9, no. 2, February 1991).

In the present invention, the calculation model based on the physical cause of the gain spectral hole burning phenomenon is applied to Δ$n_{GSHB}$ which is the parameter corresponding to a gain fluctuation portion due to the gain spectral hole burning phenomenon in the formula (2). To be specific, Δ$n_{GSHB}$ is expressed by the next formula (3).

$$\Delta n_{GSHB} = \sum_m C_m(\lambda, t, P, N_t) \cdot I(T) f(\lambda, W(T)) \quad (3)$$

Note, in the above formula (3), λ is the wavelength of the signal light, t is the total population inversion rate, P is the input power of the signal light, and $N_t$ is the concentration of the rare-earth ions. Further, $C_m(\lambda, t, P, N_t)$ is the ratio of the rare-earth ions contributing to the gain spectral hole burning, l(T) is the hole-intensity expressed as a function of the temperature, W(T) is the hole-width expressed as a function of the temperature, and f(λ, W(T)) is a function of the wavelength and the hole-width. Incidentally, as f(λ, W(T)), it is possible to apply any one of Gaussian function, Lorentz function and Voigt function.

The formula (3) includes relations shown in the next formulas (4) to (7), and corresponds to the above considerations of the calculation model. Namely, the relation of the formula (4) corresponds to the consideration in that the number of holes shown in FIG. 8 formed due to the gain spectral hole burning phenomenon is determined by the combinations of the transitions between Stark levels which are occupied by the electrons on the starting level side and the respective Stark levels on the end level side. Further, the relation of the formula (5) corresponds to the consideration in that the contribution rate to the hole forming shown in FIG. 10 depends on the input power. Furthermore, the relation of the formula (6) corresponds to the consideration in that the contribution rate to the hole forming shown in FIG. 11 depends on the total population inversion rate, and the relation of the formula (7) corresponds to the consideration in that the contribution rate to the hole forming shown in FIG. 12 depends on the rare-earth ion concentration.

$$\Delta n_{GSHB} \propto \sum_m C_m(\lambda) \quad (4)$$

$$\Delta n_{GSHB} \propto \sum_m C_m(P) \quad (5)$$

$$\Delta n_{GSHB} \propto \sum_m C_m(t) \quad (6)$$

$$t = \sum_i N_{2-i} \bigg/ \left( \sum_i N_{1-i} + \sum_i N_{2-i} \right)$$

$$\Delta n_{GSHB} \propto \sum_m C_m(Nt) \quad (7)$$

$$Nt = \sum_i N_{1-i} + \sum_i N_{2-i}$$

Accordingly, from the relations of the formulas (2) and (3), based on the power P(0) at the time when the signal light is input to the amplification medium, a value of Δ$n_{GSHB}$ in the formula (3) is calculated together with n(0), and the calculated Δ$n_{GSHB}$ is used in the formula (2), so that a minimum change in the signal light power for when the signal light is propagated through a position of the unit length Δz on a signal light input end of the amplification medium can be calculated.

Further, it is possible to add the calculated minimum change in the signal light power to the input signal light power P(0), to thereby obtain the signal light power P(Δz) propagated through the position of the unit length Δz. As a result, similarly to the above, it is also possible to calculate an optical power change in the case where the signal light is further propagated by the unit length Δz from the coordinate z=Δz in the longitudinal direction of the amplification medium.

Thus, by repetitively executing the above calculation, it becomes possible to calculate the optical power change in the case where the signal light is propagated by the unit length Δz from the coordinate z between the signal light input end (z=0) of the amplification medium and an output end (z=L) thereof, so that the optical power at the time when the signal light is finally output from the output end of the amplification medium can be calculated.

The above described simulation processing of the optical amplification characteristics is executed by the computation section 13 in accordance with the program which incorporates therein the above calculation model stored in the storage section 12 shown in FIG. 1, and the optical amplification characteristics computed using the input spectrums of the signal light input from the input section 11 and the database in the storage section 12 are output from the output section 14 as the simulation result.

Here, there will be described a specific calculation example executed by the present optical amplification characteristics simulation apparatus 1. However, the present invention is not limited to the following calculation example.

Figure 14:
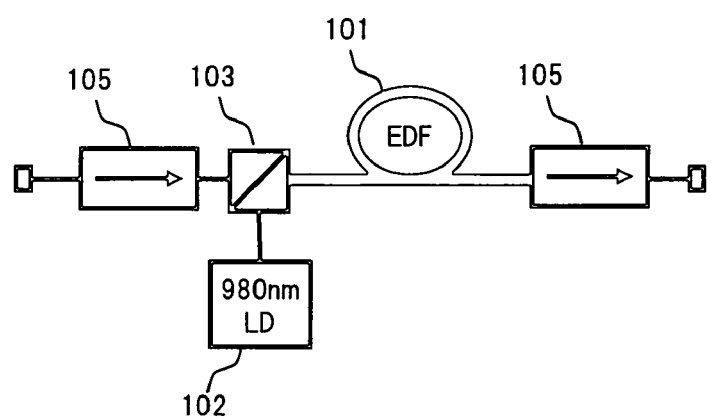
FIG. 14 is a configuration diagram showing one example of an optical amplifier which is an objective of the optical amplification characteristics simulation.

Herein, as shown in FIG. 14 for example, an EDF 101 which is made up by doping erbium ions ($Er^{3+}$) to an aluminum co-doped silica fiber is used as the amplification medium, and an EDFA of forward pumping configuration in which a pumping light output from a pumping light source (LD) 102 of 980 nm is supplied from a signal light input end of the EDF 101 via an optical coupler 103 is made to be a simulation objective. Note, in the EDF 101, the erbium ion concentration is 130 ppm, a mode field diameter is 6 μm, a core diameter is 4.5 μm, and the EDF length is 30 m. Further, the pumping light power is controlled so that a gain thereof is held constant at 11 dB in 1570 nm.

In the optical amplification characteristics simulation of the EDF as described above, the next formula (3)' can be applied as a specific function of $\Delta n_{GSHB}$ shown in the formula (3).

$$\Delta n_{GSHB} = \sum_{m}^{10} C_m(\lambda_m)\{1 - \exp(-C_m P(z))\}\sqrt{\frac{\ln 2}{\pi}} \qquad (3)'$$
$$\frac{1}{\Delta_L}(T_L/T)^\alpha \exp[-\ln 2\{2(\lambda - \lambda_m/\Delta_L)(T_L/T)^\alpha\}^2]$$

In the above formula (3)', a parameter $\lambda_m$ indicates a wavelength corresponding to the transitions between the respective Stark levels in the starting and end levels. This parameter $\lambda_m$ is a physical parameter of the EDF 101, which is determined by a field around the rare-earth ions. A parameter $\Delta_L$ is the gain hole line width at the low temperature. $T_L$ is the measured temperature obtained by measuring the parameter $\Delta_L$, and herein is the nitrogen temperature (for example, 77K). T is the room temperature (for example, 293K). Further, for the hole in the gain spectral hole burning phenomenon, it is provided that, with the temperature rise, the hole-depth is reduced, and the hole-width is increased, and also, the hole area is fixed. Furthermore, the hole shape is a model having Gaussian curve. In addition, for the input power dependence, an empiric formula is used herein.

Figure 15:
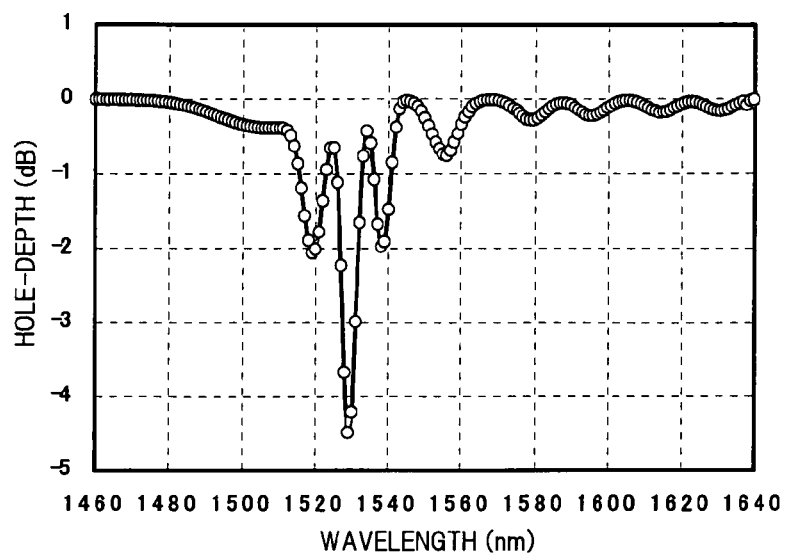
FIG. 15 is a graph showing a calculation result of the hole-depth at the low temperature by the simulation apparatus in FIG. 1.

FIG. 15 shows a calculation result of the hole-depth due to the gain spectral hole burning phenomenon at the low temperature, using the calculation model of the formula (3)'. This calculation result indicates the good coincidence with the actual measurement result shown in FIG. 6, which is obtained by the measurement under a condition similar to the simulation, and accordingly, it is understood that the formula (3)' is the effective calculation model for the gain spectral hole burning phenomenon.

At the low temperature as described in the above, since the hole-width in the gain spectral hole burning becomes relatively narrower, it is considered that the gain reduction due to the gain spectral hole burning does not occur in the vicinity of this wavelength even in the case where an automatic gain control is performed at a wavelength (herein, 1570 nm) between the sub-holes, and accordingly, it is possible to obtain the spectrums in the pure gain spectral hole burning by the measurement. On the other hand, at the room temperature, the hole-width in the gain spectral hole burning becomes broader, and the sub-holes are overlapped with each other, so that the gain reduction due to the gain spectral hole burning occurs also in the vicinity of a reference wavelength in the automatic gain control. Therefore, it becomes hard to obtain the spectrums in the pure gain spectral hole burning by the measurement.

Figure 16:
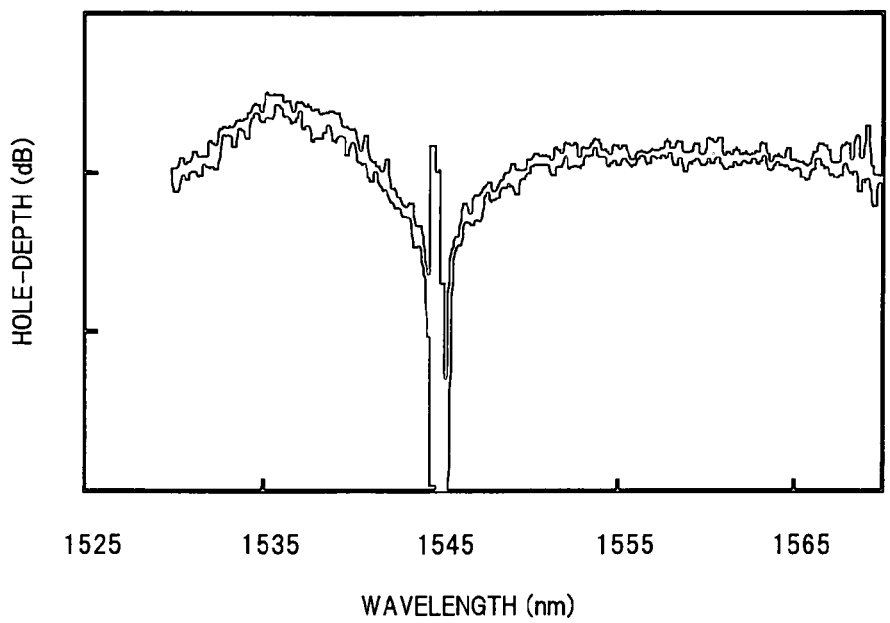
FIG. 16 is a graph showing a measuring result of the hole-depth at the room temperature, in a C-band EDFA which is automatically gain controlled.

To be specific, FIG. 16 shows a measurement result of the gain spectral hole burning at the room temperature for a C-band EDF of which gain is controlled to be constant at 1560 nm. As shown in this actual measurement result, it is understood that the hole-depth is positive on the shorter wavelength side. This positive hole is caused by that, in the case where the hole due to the gain spectral hole burning is formed in the vicinity of 1560 nm and the gain reduction occurs, the pumping light power is controlled for covering a gain reduction portion. In other words, in order to cover the gain reduction portion at 1560 nm, the pumping light power is controlled for increasing the total population inversion rate, and as a result, since gain wavelength characteristics are changed according to the increase of the total population inversion rate, the hole-depth seems just like the positive hole on the shorter wavelength side at which the gain coefficient is high. That is to say, the pure gain spectral hole burning by the saturating signal light is not observed.

Figure 17:
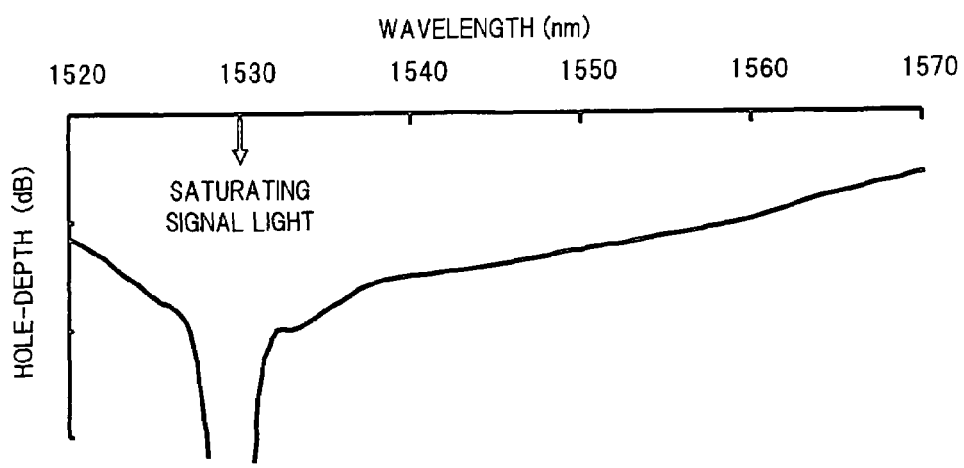
FIG. 17 is a graph showing a calculation result of the hole-depth at the room temperature by the simulation apparatus in FIG. 1.

Thus, in the case of the room temperature at which the hole-width is broadened, it is hard to obtain the spectrums in the pure gain spectral hole burning by the measurement. However, according to the simulation using the calculation model of the formula (3)', it s possible to obtain the spectrums in the pure gain spectral hole burning by the calculation. FIG. 17 shows a calculation result for the case of the room temperature, and it is understood that the gain reduction occurs over a significantly broad wavelength range due to the gain spectral hole burning which occurs by the incidence of the saturating signal light in the vicinity of 1530 nm.

As described in the above, by incorporating the calculation model of the formula (3)' into the simulation program, also for the case where the gain fluctuation occurs due to the gain spectral hole burning phenomenon, it becomes possible to simulate with high precision the optical amplification characteristics of the EDFA shown in FIG. 14. In particular, it is possible to accurately simulate the gain spectral hole burning phenomenon at the room temperature, which practically occurs but is hard to be actually measured.

Figure 18:
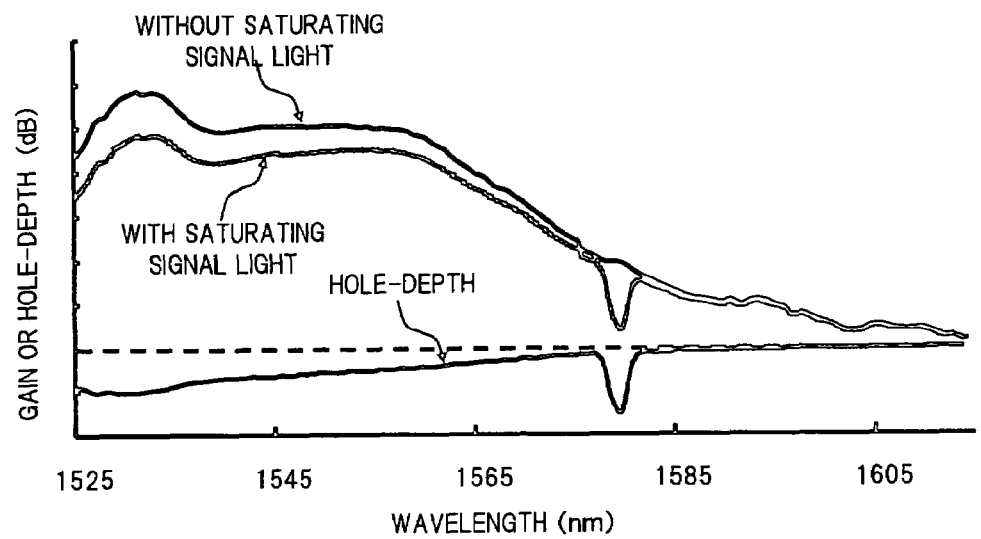
FIG. 18 is a graph showing one example of the hole-depth in a L-band region by the simulation apparatus in FIG. 1.

The calculation results shown in FIG. 15 and FIG. 17 are obtained by performing the computation so as to obtain the gain spectral hole burning phenomenon in the C-band region of the EDFA. However, according to the simulation incorporating the calculation model (3)', as shown in FIG. 18 for example, it is also possible to obtain the spectrums in the gain spectral hole burning phenomenon for a L-band (Long wavelength Band) region of the EDFA. To be specific, as shown in the next table 1, there are various types of wavelengths corresponding to the transitions between Stark levels of the starting level and each Stark level of the end level, and the transition wavelength $\lambda_5$ corresponds to the L-band region.

TABLE 1

| Transition wavelength between Stark levels | |
|---|---|
| $\lambda_{-1}$ | 1490.0 |
| $\lambda_0$ | 1504.1 |
| $\lambda_1$ | 1519.7 |
| $\lambda_2$ | 1530.4 |
| $\lambda_3$ | 1539.7 |
| $\lambda_4$ | 1557.7 |
| $\lambda_5$ | 1580.3 |
| $\lambda_6$ | 1596.5 |
| $\lambda_7$ | 1615.6 |
| $\lambda_8$ | 1631.5 |

Consequently, by using the calculation model according to the present invention based on the transitions between Stark levels, it becomes also possible to simulate with high precision the gain spectral hole burning phenomenon occurring in the vicinity of 1580 nm, similarly to the C-band region. Thus, according to the present simulation apparatus 1, it becomes also possible to predict the optical amplification characteristics for a new wavelength range or a new input/output power range.

By feeding the simulation result of the optical amplification characteristics according to the present invention back to the designing of the optical amplifier such as the EDFA, it becomes possible to perform the review for suppressing the gain spectral hole burning phenomenon in view of materials, the review for suppressing the gain spectral hole burning phenomenon by optimizing a structural parameter of the optical fiber used for the amplification medium, and the like.

Further, in the conventional calculation model for the gain spectral hole burning, it is necessary to obtain the calculation model for each optical amplifier. However, according to the present simulation apparatus, it becomes possible to perform the simulation of the optical amplification characteristics considering the gain fluctuation due to the gain spectral hole burning phenomenon, for arbitrary amplification wavelength ranges, arbitrary wavelength numbers and arbitrary wavelength allocation, arbitrary input/output power ranges, arbitrary gain ranges, and arbitrary temperature ranges. Therefore, it is possible to make the efficient design on the optical amplifier.

Next, there will be described another embodiment of the optical amplification characteristics simulation apparatus according to the present invention.

In the simulation apparatus in the above embodiment, as the database for simulating the optical amplification characteristics, it is necessary to store in the storage section 12 the information relating to the configuration of the optical amplifier (for example, the pumping wavelength, the length of the amplification medium, the loss in the constituent optical part, the pumping light control method, and the like) and the characteristic parameters for the amplification medium (for example, the rare-earth ion concentration, the glass composition of the fiber, and the like). Contrary to this, in the following embodiment, there will be described an application example in which the optical amplification characteristics can be simulated without the necessity of the information relating to the configuration of the optical amplifier.

Figure 19:
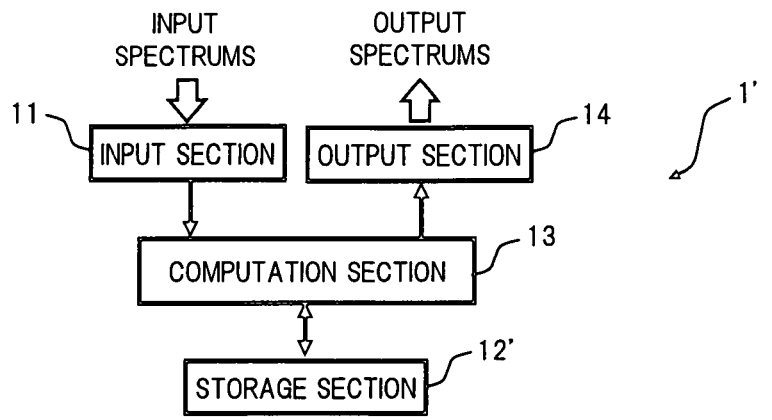
FIG. 19 is a block diagram showing a configuration of another embodiment of the optical amplification characteristics simulation apparatus according to the present invention.

FIG. 19 is a block diagram showing a configuration of the simulation apparatus according to another embodiment.

In FIG. 19, the simulation apparatus 1' in the present embodiment comprises, for example, the input section 11, a storage section 12', the computation section 13 and the output section 14. The input section 11, the computation section 13 and the output section 14 are basically similar to those in the above embodiment, but information to be stored in the storage section 12' is different from that in the above embodiment.

To be specific, in the storage section 12', an average gain $G_{AVE}$ corresponding to a set gain of the automatically gain controlled optical amplifier, the gain deviation $\Delta G$ indicating a difference between the average gain $G_{AVE}$ and a gain of each wavelength, a gain fluctuation amount $\Delta G_{GSHB}(\lambda)$ and the characteristic parameters for the amplification medium are stored as a database, together with a simulation program.

Figure 32:
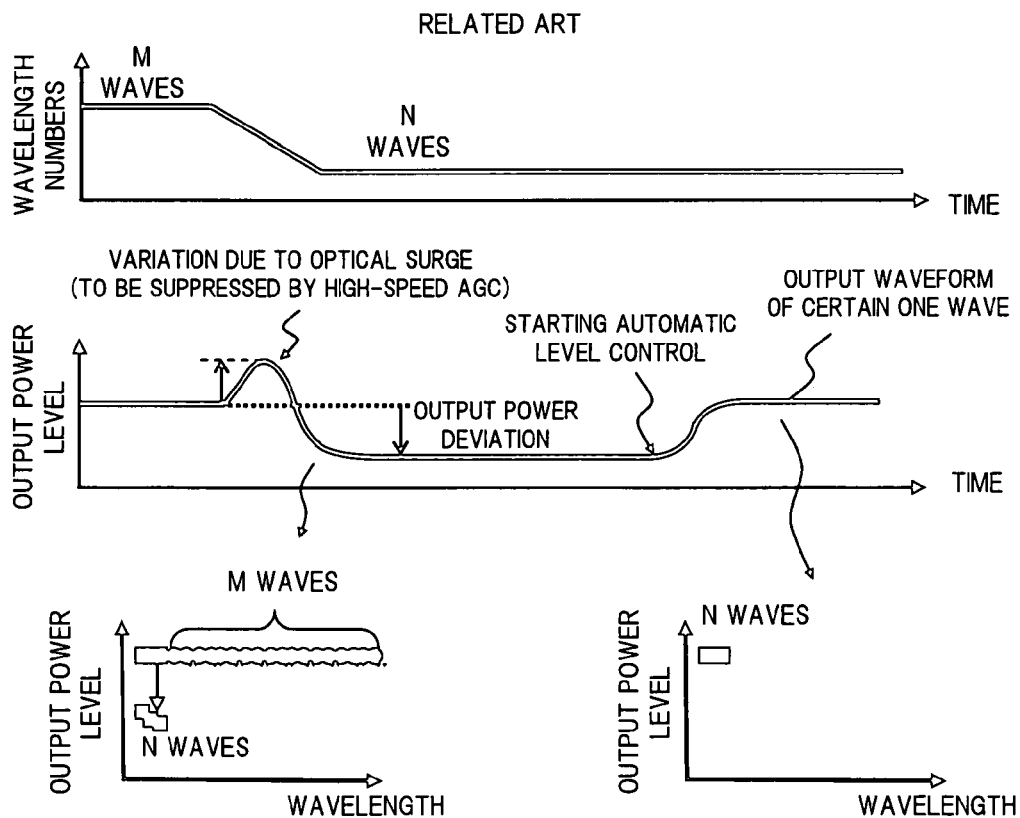
FIG. 32 is a diagram for explaining a change in output power level of the optical amplifier, which occurs when the wavelength numbers of the signal light and the wavelength allocation thereof are significantly changed.

Here, there will be described in detail the output power deviation occurring in the optical amplifier when the wavelength numbers are changed from M waves to N waves shown in FIG. 32.

When the wavelength numbers of the signal light and the wavelength allocation thereof are significantly changed due to the wavelength routing in the OADM nodes and the like in an optical transmission system, one of the causes of the output power deviation which occurs after an optical surge caused in the optical amplifier is suppressed by the high-speed AGC is the gain spectral hole burning phenomenon and another cause is the gain deviation which is the difference between the gain of each wavelength and the average gain which is set to be constant irrespectively of the wavelength numbers of the signal light and the wavelength allocation thereof.

Regarding the output power deviation due to the gain spectral hole burning phenomenon, as already described in detail, the physical cause of the gain spectral hole burning phenomenon is regarded to be the reduction of the population inversion rate between Stark levels caused by the increase of the electron occupation numbers in the end level, and therefore, it is possible to simulate with high precision the optical amplification characteristics using the calculation model shown in the formula (3) or the formula (3)'. However, in order to calculate the gain difference $\Delta G_{GSHB}(\lambda)$ in the gain spectral hole burning of the optical amplifier, the configuration of the optical amplifier is needed. In order to obtain $\Delta G_{GSHB}(\lambda)$ without the necessity of the configuration of the optical amplifier, there is the following method for example.

The optical amplifier is operated at maximum wavelength numbers, thereby performing the automatic gain control. Further, in order to measure $\Delta G_{GSHB}(\lambda)$ at desired wavelength numbers and the desired wavelength allocation, the signal light of the desired wavelength numbers and desired wavelength allocation and one wave of the longest wavelength are incident on the optical amplifier, and the optical amplifier is operated so that a gain of the longest wavelength at the time becomes same as a gain of the longest wavelength for when the automatic gain control is performed at the maximum wavelength numbers. Then, by calculating a difference between gain wavelength characteristics which are measured when the optical amplifier is operated at the maximum wavelength numbers and gain wavelength characteristics which are measured when the optical amplifier is operated at the desired wavelength numbers and the desired wavelength allocation and also the one wave of the longest wavelength, it is possible to obtain $\Delta G_{GSHB}(\lambda)$.

In the above method, $\Delta G_{GSHB}(\lambda)$ is obtained by previously measuring the characteristics of the optical amplifier. However, in the case where the configuration of the optical amplifier is already known, $\Delta G_{GSHB}(\lambda)$ may be surely calculated using the calculation model shown in the formula (3) or the formula (3)'.

Most of optical amplifiers applied to a WDM optical transmission system is each subjected to the automatic gain control by which an input/output power ratio thereof is held constant considering an optical noise portion. In the optical amplifier which is automatically gain controlled, in the case where the gain thereof is reduced due to the gain spectral hole burning phenomenon, a gain working point being a dominant factor of the wavelength characteristics of the amplification medium is shifted and the pumping light power is controlled so that the average gain reaches a desired value. For example, in the case of the wavelength allocation in which the main holes in the gain spectral hole burning phenomenon are formed collectively on the shorter wavelength side, further deep holes are formed. In the automatic gain control, the pumping light power is increased so as to compensate for the gain reduction due to the deeper holes, thereby shifting the gain working point. A shift amount of the gain working point at the time is increased, compared with a shift amount in the case of the wavelength allocation of the signal light in which the holes are formed collectively on the longer wavelength side at which the hole-depth becomes relatively shallow. When the shift amount of the gain working point is increased, since the change in gain wavelength characteristics is increased, the output power deviation is also increased. Further, the hole-depth is increased as the wavelength spacing of the adjacent signal lights is narrower or as the wavelength numbers are less. Therefore, also in such a case, the shift amount of the gain working point is increased and accordingly, the output power deviation is increased.

Figure 27:
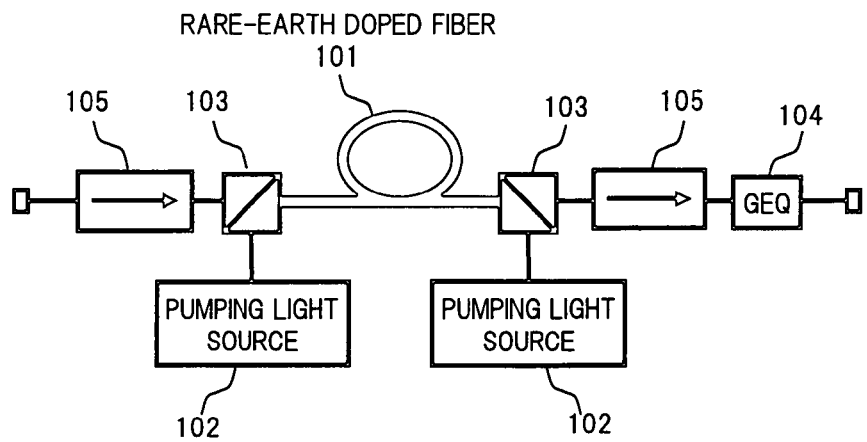
FIG. 27 is a diagram showing a configuration of a typical optical amplifier which is applied to a WDM optical transmission system.
Figure 28:
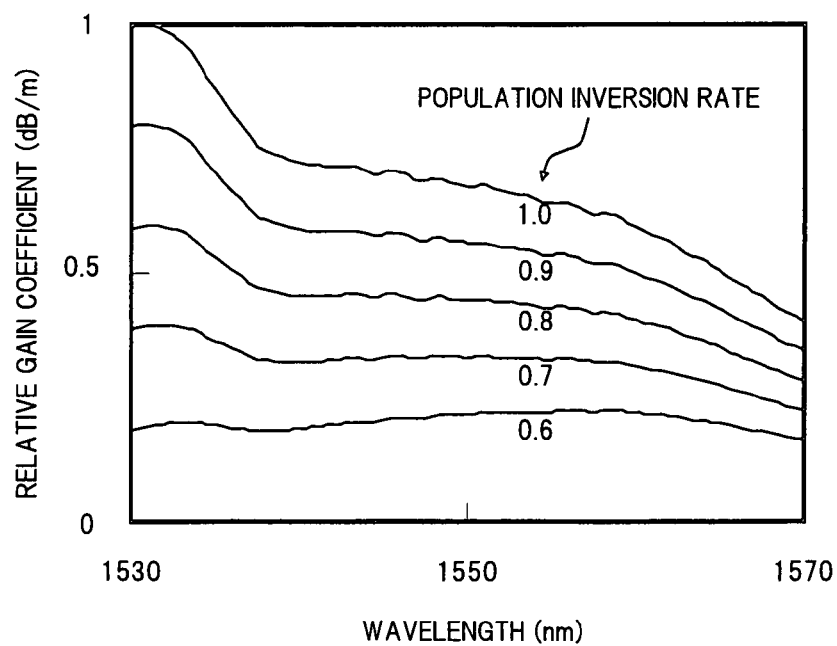
FIG. 28 is a graph showing gain wavelength characteristics of the optical amplifier in FIG. 27 according to a population inversion rate.

Further, explaining the output power deviation due to the gain deviation which is the difference between the average gain and the gain of each wavelength, as shown in FIG. 27, the optical amplifier applied to the WDM optical transmission system comprises a rare-earth doped fiber 101 as the amplification medium, a pumping light source 102, a coupler 103 multiplexing the signal light and the pumping light, and a gain equalizer 104 performing the gain flattening, and an optical circuit configuration thereof and a gain working point of the rare-earth doped fiber are designed, taking into consideration of the input power of the signal light of respective wavelengths and the output power of each necessary wavelength and optical noise characteristics. Since transmission (or loss) characteristics of each optical part making up the optical amplifier and the gain in the rare-earth doped fiber are different depending on the wavelengths, the wavelength dependence occurs in the output power. In order to cancel the wavelength dependence so that the output power of each wavelength becomes approximately constant, the gain equalizer 104 is used. As this gain equalizer 104, many times, there are used a multi-layer filter device or a fiber grating device, which is a passive part. Even if the designing is made so that wavelength characteristics of the gain equalizer 104 become optimum, corresponding to wavelength characteristics of each optical part and of the rare-earth doped fiber, the gain deviation occurs due to irregularity in the wavelength characteristics of each optical part.

Figure 20:
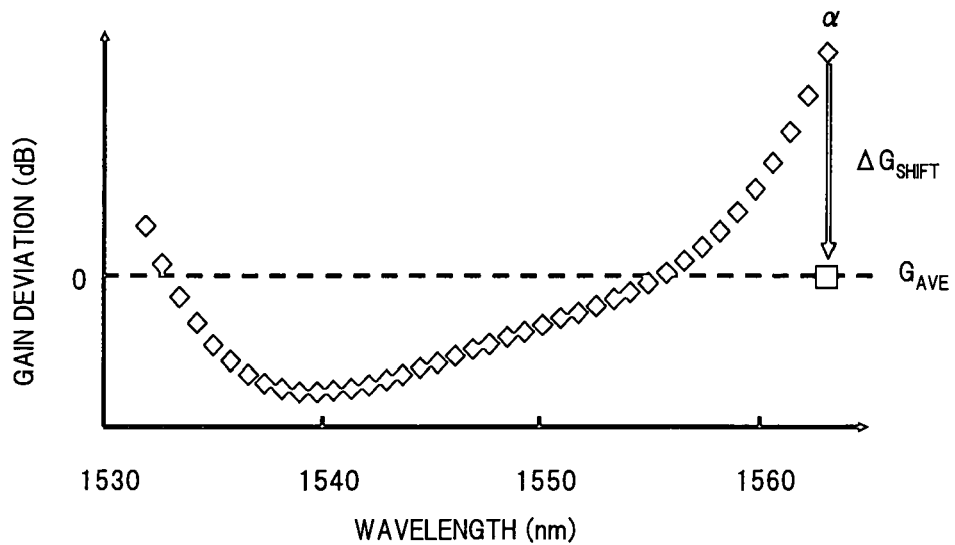
FIG. 20 is a graph for explaining the cause of an occurrence of output power deviation due to the gain deviation in an optical amplifier which is automatically gain controlled.

In considering the cause by which the output power deviation occurs due to such gain deviation, herein as shown in FIG. 20 for example, the consideration is made on the case where the wavelength numbers of the signal light and the wavelength allocation thereof are changed from a first state where the signal lights are uniformly arranged in 100 GHz spacing to a second state where only the signal light of one wave is remained in the longest wavelength. In this case, in the first state, the average gain $G_{AVE}$ is the set gain, and the gain deviation in each wavelength is a difference from the average gain $G_{AVE}$ (a broken line in the figure). In the optical amplifier which is automatically gain controlled, basically, the pumping light power is controlled so that the average gain $G_{AVE}$ reaches a predetermined set gain irrespectively of changes in the wavelength numbers of the signal light and the wavelength allocation thereof (note, in the case where wavelength numbers are changed when a small numbers of signal lights is input, actually, the set gain is set taking into consideration of the optical noise power).

In the first state, paying attention to the signal light of longest wavelength α which is remained in the second state after the change in the wavelength numbers, this signal light has a gain higher than the average gain $G_{AVE}$ (=the set gain). Then, in the second state where only the signal light of longest wavelength is remained and other signal lights are all extracted, the pumping light power is controlled by the automatic gain control, so that the gain at the longest wavelength α reaches the predetermined set gain. Namely, by shifting from the first state to the second state, for the signal light of wavelength α, the gain, that is, the output power, is fluctuated by $\Delta G_{SHIFT}$ in the figure, so that the output power deviation occurs.

In the optical amplifier which is automatically gain controlled as described in the above, the gain working point is shifted due to the gain spectral hole burning phenomenon and the gain deviation, and the shift of the gain working point causes the output power deviation. In order to simulate such output power deviation, conventionally, using the calculation model which needs the detailed information relating to the optical amplifier configuration, the optical amplification characteristics have been calculated. Contrary to this, in the simulation apparatus 1' in the present embodiment, as described hereunder, the optical amplification characteristics can be calculated without the necessity of the detailed information relating to the optical amplifier configuration.

To be specific, in the present simulation apparatus 1', as the information relating to the signal light input to the optical amplifier which is the simulation objective, input spectrums $P_{IN}(\lambda)$ containing the information relating to the wavelength numbers of the signal light and the wavelength allocation thereof, and the information relating to a noise light are input via the input section 11. By using the input information and the database stored in the storage section 12', the optical amplification characteristics corresponding to the signal light of desired wavelength numbers and of the desired wavelength allocation are simulated in the computation section 13, and as the simulation result, output spectrums $P_{OUT}(\lambda)$ containing the information relating to wavelength numbers of an output light and the wavelength allocation thereof, and also the information relating to the noise light are output from the output section 14.

As the database used for the optical amplification characteristics simulation in the computation section 13, as described in the above, there are used the average gain $G_{AVE}$ in the reference wavelength numbers and the reference wavelength allocation, the gain deviation $\Delta G(\lambda)$ indicating the difference between the average gain $G_{AVE}$ and the gain of each wavelength, the gain fluctuation amount $\Delta G_{GSHB}(\lambda)$ due to the gain spectral hole burning phenomenon in the optical amplifier and the characteristic parameters (the wavelength dependence of the absorption coefficient and the wavelength dependence of the gain coefficient) for the amplification medium. Otherwise, in the case where the configuration of the optical amplifier is already known, in accordance with the optical circuit configuration thereof and the pumping method, the computation section 13 applies the calculation model shown in the formula (3) or the formula (3)' to obtain the gain change amount due to the gain spectral hole burning phenomenon in the optical amplifier, which occurs at the optical amplification time in the reference wavelength numbers and the reference wavelength allocation, and the gain change amount due to the gain spectral hole burning phenomenon in the optical amplifier, which occurs at the optical amplification time in the desired wavelength numbers and the desired wavelength allocation, to thereby calculate the difference value $\Delta G_{GSHB}(\lambda)$ thereof.

Figure 21:
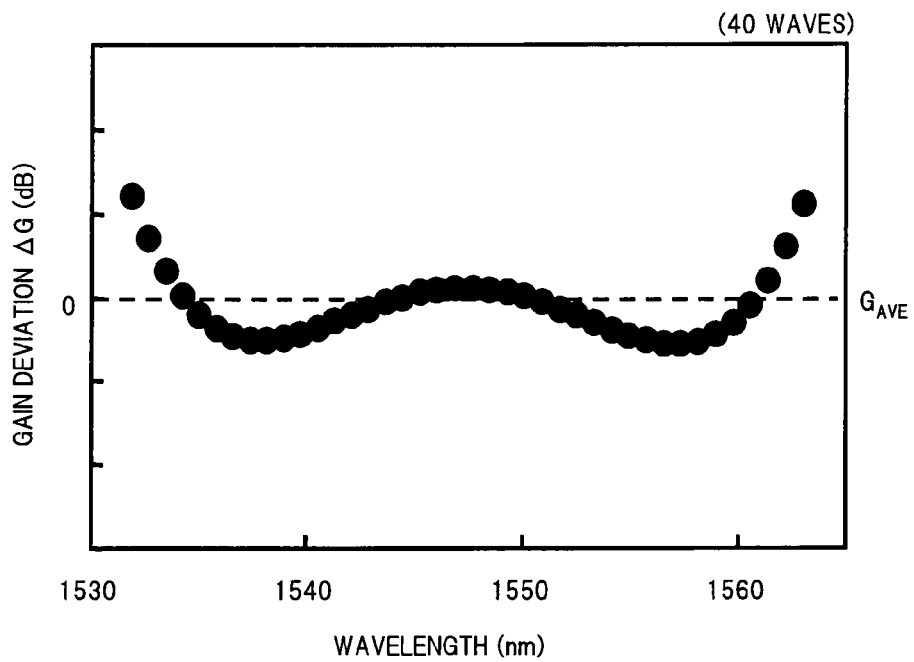
FIG. 21 is a graph exemplarily showing an average gain and the gain deviation of a C-band EDFA which is operated at 40 waves.

To be specific, considering a state where the signal light of 40 waves (the maximum wavelength numbers) is allocated at 100 GHz in equal spacing as the reference wavelength numbers and the reference wavelength allocation, and also, considering a state where the signal light of 32 waves is allocated at 100 GHz in equal spacing as the desired wavelength numbers and the desired wavelength allocation, data as shown in FIG. 21 is used as the average gain $G_{AVE}$ and the gain deviation $\Delta G(\lambda)$ in the C-band EDFA which is operated at 40 waves. Further, data as shown in FIG. 22 for example is used as the difference value $\Delta G_{GSHB}(\lambda)$ of the gain change amount due to the gain spectral hole burning phenomenon in the case where the operated wavelength numbers are changed from 40 waves to 32 waves.

Figure 22:
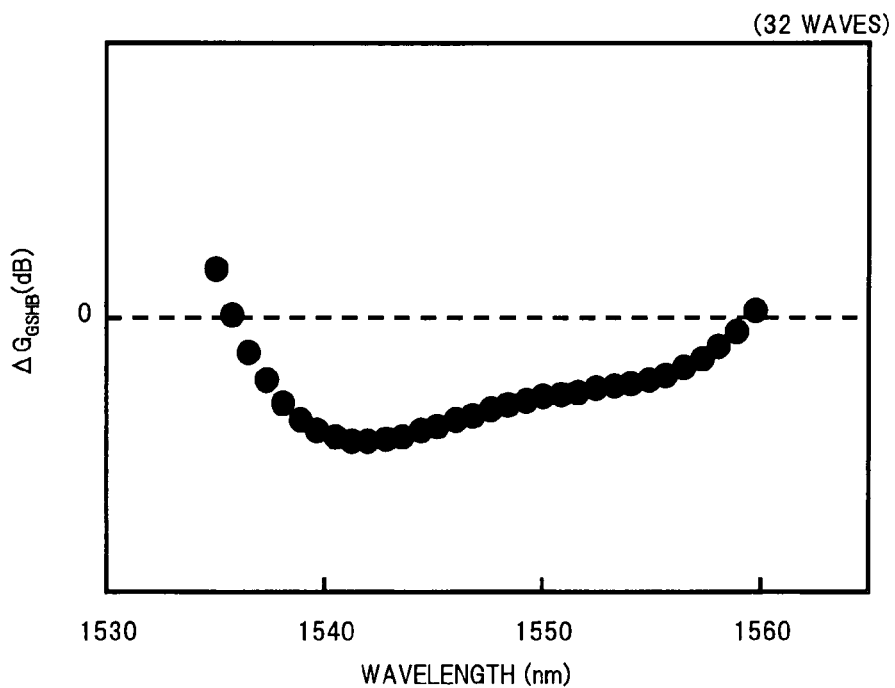
FIG. 22 is a graph exemplarily showing an average gain and the gain deviation of a C-band EDFA which is operated at 32 waves.

By using the average gain $G_{AVE}$, the gain deviation $\Delta G(\lambda)$ and the difference value $\Delta G_{GSHB}(\lambda)$ of the gain change amount due to the gain spectral hole burning phenomenon as shown in FIG. 21 and FIG. 22, the gain $G(\lambda)$ of each wavelength of the EDFA which is automatically gain controlled is expressed by the next formula (8) using the gain fluctuation $\Delta G_{SHIFT}(\lambda)$ at each wavelength, which occurs due to the gain working point shift with the change in the wavelength numbers from 40 waves to 32 waves, as a calculating parameter.

$$G(\lambda) = G_{AVE} + \Delta G(\lambda) + \Delta G_{GSHB}(\lambda) + \Delta G_{SHIFT}(\lambda) \tag{8}$$

By using the gain $G(\lambda)$ calculated in accordance with the formula (8) and the input spectrums $P_{IN}(\lambda)$ supplied from the input section 11, the output spectrums $P_{OUT}(\lambda)$ of the EDFA which is operated at 32 waves after the wavelength numbers change can be calculated in accordance with the next formula (9).

$$P_{OUT}(\lambda)=P_{IN}(\lambda)+G(\lambda) \quad (9)$$

Thus, in the simulation apparatus 1' of the present embodiment, the optical amplification characteristics simulation is performed using the model formula which regards the optical amplifier as a so-called black box, without the necessity of the information relating to the optical amplifier configuration, such as the pumping wavelength for the optical amplifier, the length of the amplification medium, the loss in the constituent optical part, the pumping light control method.

Figure 23:
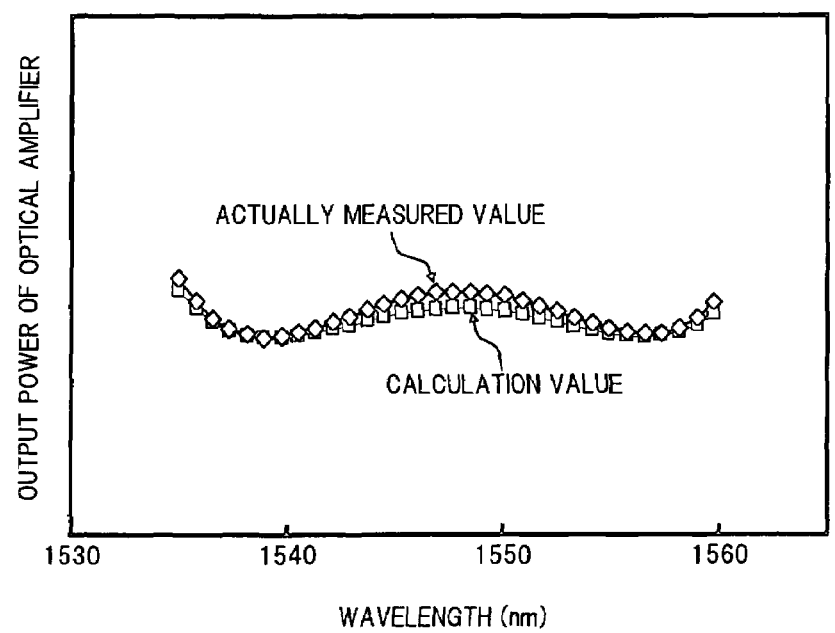
FIG. 23 is a graph showing the comparison of a calculation result of output spectrums of the optical amplifier by the simulation apparatus in FIG. 19 with an actually measured value thereof.
Figure 24:
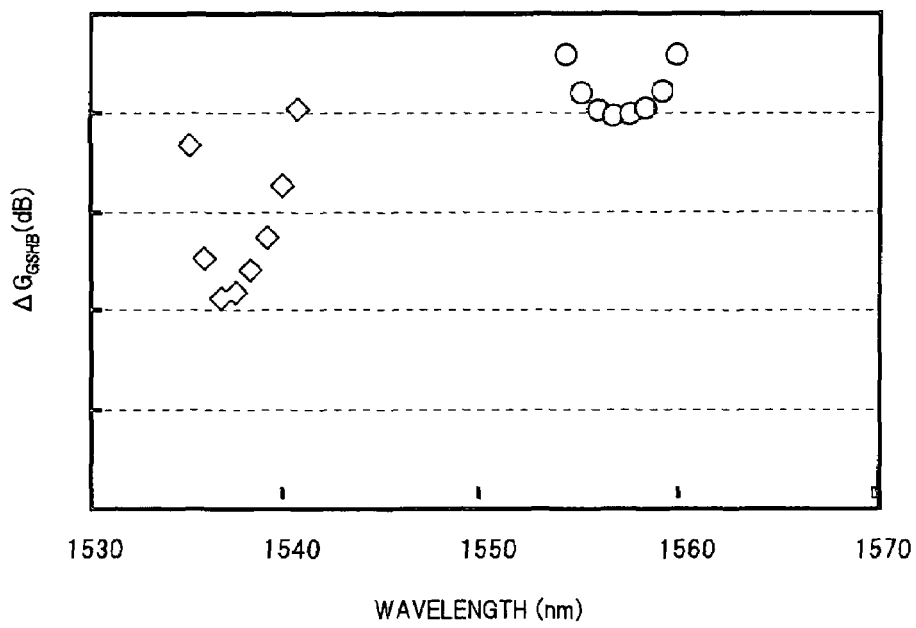
FIG. 24 is a graph for explaining that a difference between gain change amounts due to the gain spectral hole burning phenomenon depends on the wavelength allocation of the signal light.

FIG. 23 shows the calculation result of the output spectrums using the black box optical amplifier model as described in the above and the result of actually measuring the output spectrums under the similar condition. From FIG. 23, it is understood that the calculation result of the output spectrums is in good coincidence with the measurement result thereof. Consequently, in the present simulation apparatus 1', it is possible to simulate with high precision the output spectrums $P_{OUT}(\lambda)$ of the automatically gain controlled optical amplifier, taking into consideration of the influence by the output power deviation caused by the gain spectral hole burning and the gain deviation.

Here, there will be described a specific example of the computation processing executed by the computation section 13 in the present simulation apparatus 1'. In the following description, provided that the state before the changes of the wavelength numbers and the wavelength allocation is the first state and the state after the changes thereof is the second state, the computation of the output spectrums is performed for each state.

In one specific example of the computation processing in the computation section 13, in the calculation processing of the output spectrums in the first state, there are used, as a database, the average gain $G_{AVE}$ and the gain deviation $\Delta G_1(\lambda)$ indicating the difference between the average gain $G_{AVE}$ and the gain of each wavelength in the first state. Gain $G_1(\lambda)$ of each wavelength in the first state is expressed by $G_1(\lambda)=G_{AVE}+\Delta G_1(\lambda)$ using the above database. Thus, output spectrums $P_{OUT1}(\lambda)$ in the first state are calculated by $P_{OUT1}(\lambda)=P_{IN1}(\lambda)+G_1(\lambda)$, using input spectrums $P_{IN1}(\lambda)$ and the gain $G_1(\lambda)$ which correspond to the first state.

On the other hand, in the calculation processing of the output spectrums in the second state, there are used, as a database, the average gain $G_{AVE}$ and the gain deviation $\Delta G_1(\lambda)$ which are same as those in the first state, and the difference value $\Delta G_{GSHB}(\lambda)$ of the gain change amount due to the gain spectral hole burning which occurs when the wavelength numbers and the wavelength allocation are changed from the first state to the second state. Gain $G_2(\lambda)$ of each wavelength in the second state is expressed by $G_2(\lambda)=G_{AVE}+\Delta G_1(\lambda)+\Delta G_{GSHB}(\lambda)+\Delta G_{SHIFT}(\lambda)$ using the above database and using, as a calculating parameter, the gain fluctuation $\Delta G_{SHIFT}(\lambda)$ in each wavelength which occurs due to the gain working point shift with the change from the first state to the second state. Thus, output spectrums $P_{OUT2}(\lambda)$ in the second state are calculated by $P_{OUT2}(\lambda)=P_{IN2}(\lambda)+G_2(\lambda)$, using input spectrums $P_{IN2}(\lambda)$ and the gain $G_2(\lambda)$ which correspond to the second state.

Further, in the case of calculating the characteristics fluctuation around the change from the first state to the second state, the optical output power fluctuation is obtained by subtracting $P_{OUT1}(\lambda)$ from $P_{OUT2}(\lambda)$. Furthermore, the optical SN ratio fluctuation is obtained by separating signal components from noise components in each of $P_{OUT1}(\lambda)$ and $P_{OUT2}(\lambda)$ to obtain a ratio $OSNR_1(\lambda)$ between the signal component and the noise component in the first state and a ratio $OSNR_2(\lambda)$ between the signal component and the noise component in the second state, to thereby subtract the ratio $OSNR_1(\lambda)$ from $OSNR_2(\lambda)$.

In connection with the above specific example of the computation processing in the computation section 13, there will be additionally described another specific example of which versatility is further improved.

In such another example, in the calculation processing of the output spectrums in the first state, there are used as a database, the average gain $G_{AVE}$, the gain deviation $\Delta G(\lambda)$ indicating the difference between the average gain $G_{AVE}$ and the gain of each wavelength in a state where the amplification is performed in the reference wavelength numbers and the reference wavelength allocation (to be referred to as a reference state hereunder), and a difference value $\Delta G_{GSHB1}(\lambda)$ of the gain change amount due to the gain spectral hole burning which occurs when the wavelength numbers and the wavelength allocation are changed from the reference state to the first state. The gain $G_1(\lambda)$ of each wavelength in the first state is expressed by $G_1(\lambda)=G_{AVE}+\Delta G(\lambda)+\Delta G_{GSHB1}(\lambda)+\Delta G_{SHIFT1}(\lambda)$ using the above database and using, as a calculating parameter, the gain fluctuation $\Delta G_{SHIFT1}(\lambda)$ in each wavelength, which occurs due to the gain working point shift with the change from the reference state to the first state. Thus, the output spectrums $P_{OUT1}(\lambda)$ in the first state are calculated by $P_{OUT1}(\lambda)=P_{IN1}(\lambda)+G_1(\lambda)$, using the input spectrums $P_{IN1}(\lambda)$ and the gain $G_1(\lambda)$ which correspond to the first state.

On the other hand, in the calculation processing of the output spectrums in the second state, there are used, as a database, the average gain $G_{AVE}$ and the gain deviation $\Delta G(\lambda)$ which are same as those in the first state, and a difference value $\Delta G_{GSHB2}(\lambda)$ of the gain change amount due to the gain spectral hole burning which occurs when the wavelength numbers and the wavelength allocation are changed from the first state to the second state. The gain $G_2(\lambda)$ of each wavelength in the second state is expressed by $G_2(\lambda)=G_{AVE}+\Delta G(\lambda)+\Delta G_{GSHB2}(\lambda)+\Delta G_{SHIFT2}(\lambda)$ using the above database and using, as a calculating parameter, the gain fluctuation $\Delta G_{SHIFT2}(\lambda)$ in each wavelength, which occurs due to the gain working point shift with the change from the first state to the second state. Thus, the output spectrums $P_{OUT2}(\lambda)$ in the second state are calculated by $P_{OUT2}(\lambda)=P_{IN2}(\lambda)+G_2(\lambda)$ using the input spectrums $P_{IN2}(\lambda)$ and the gain $G_2(\lambda)$ which correspond to the second state.

Further, in the case of calculating the characteristics fluctuation around the change from the first state to the second state, it is possible to obtain the optical output power fluctuation and the optical SN ratio variation by a calculating method similar to that in the above described specific example.

As described in the above, in the specific example of the computation processing, the first state is made to be a reference and the gain characteristics in the second state are calculated as the difference from those in the first state. Contrary to this, in another specific example of the computation processing described in the above, the reference state is set differently from the first and second states, and the gain characteristics in the first and second states are calculated as the differences from those in the reference state. If for example a state which corresponds to the maximum wavelength numbers capable of being amplified by the optical amplifier is set as the reference value, sometimes, such an optical amplifier is not operated at the maximum wavelength numbers, depending on the optical transmission system to which such optical amplifiers are applied, and accordingly, in the above specific example of the computation processing, it is necessary to prepare $\Delta G_{GSHB}$ ($\lambda$) which is individually calculated according to operation states of the optical transmission system. However, in another specific example of the computation processing described above, since the operation state at the maximum wavelength numbers can be made to be the reference state, it is no longer necessary to individually prepare data according to the system operation states, and therefore, it is possible to improve the versatility.

Further, in the above simulation apparatus 1', it is desirable that the difference value $\Delta G_{GSHB}$ ($\lambda$) of the gain change amount due to the gain spectral hole burning phenomenon is the data reflecting characteristics of the gain spectral hole burning phenomenon in which the gain change amount in the case where the saturating signal light is allocated in concentrative on the shorter wavelength side is increased compared with the gain change amount in the case where the saturating signal light is allocated in concentrative on the longer wavelength side. Specifically explaining the characteristics of the gain spectral hole burning phenomenon in relation to the wavelength allocation of the saturating signal light, the gain change amount due to the gain spectral hole burning phenomenon which occurs when the optical amplifier which has been operated at the maximum wavelength numbers of 40 waves is operated at 8 waves becomes larger than the gain change amount due to the gain spectral hole burning phenomenon which occurs when the optical amplifier is operated at 8 waves on the longer wavelength side.

Next, there will be described the case where transmission characteristics of the optical transmission system using the optical amplifiers are simulated by applying the optical amplification characteristics simulation technology as described above.

Figure 29:
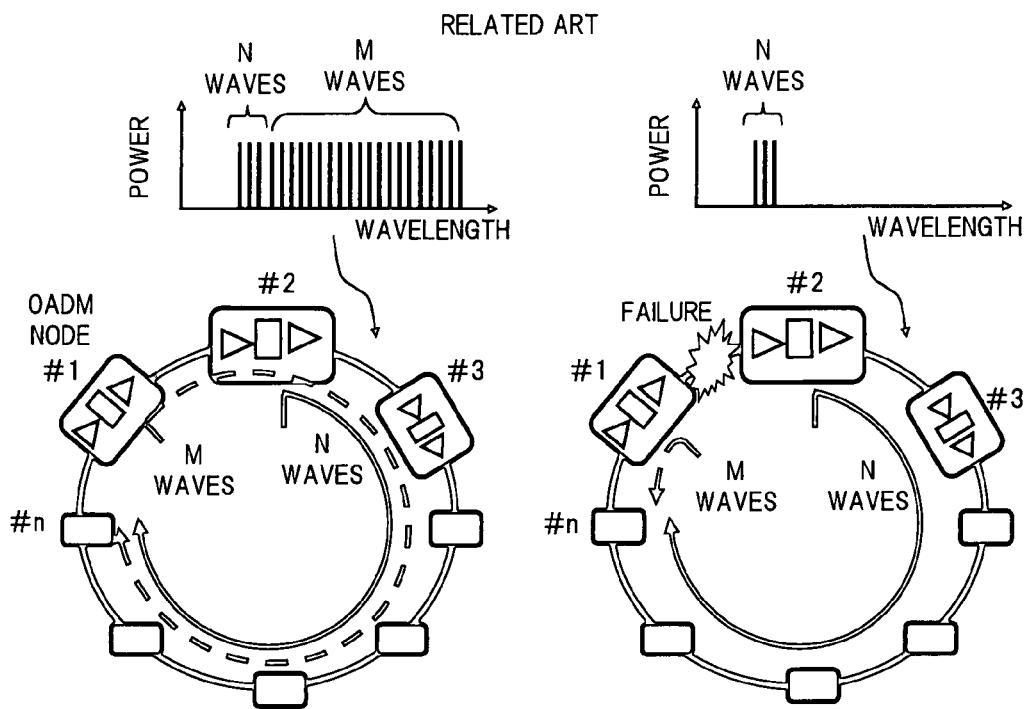
FIG. 29 is a diagram showing one example in which wavelength numbers of the signal light and the wavelength allocation thereof are significantly changed in a WDM optical transmission system provided with nodes each having a wavelength routing function.

According to the above described optical amplification characteristics simulation apparatuses 1 and 1' for the optical amplifier, by constructing the new calculation models for the gain spectral hole burning phenomenon and also, considering the model which regards the optical amplifier as the black box, it becomes possible to simulate with high precision the optical amplification characteristics without the necessity of the detailed design information relating to the optical amplifier configuration. In the case where the transmission characteristics of the optical transmission system using the optical amplifiers is simulated by applying this simulation technology for the optical amplifier, it becomes necessary not only to simulate the optical amplification characteristics of a single optical amplifier but also to calculate the transmission characteristics of the entire system considering characteristics of a transmission path connected to the optical amplifier and the like. Therefore, in an embodiment of the simulation apparatus corresponding to the optical transmission system as shown in below, assuming a situation where the WDM optical transmission system as shown in FIG. 29 is failed, the consideration is made on the case of simulating the level fluctuation of the signal light which is propagated through the transmission path connected each node to reach a reception end.

As factors of the output power deviation of the signal light in the WDM optical transmission system applying the automatically gain controlled optical amplifiers, there can be considered the fluctuation of the stimulated Raman scattering (SRS) occurring in the transmission path or a dispersion compensation fiber, around the changes of the wavelength numbers of the transmitted signal light and of the wavelength allocation thereof, in addition to the above described gain working point shift due to the gain spectral hole burning phenomenon and the gain deviation. Therefore, it is necessary to apply the calculation model which regards the automatically gain controlled optical amplifier as the black box as in the above simulation apparatus 1' and also, to construct a calculation model corresponding to optical output power characteristics in the transmission path and a wavelength routing device which are connected to the latter stage of the optical amplifier, to thereby perform the transmission characteristics simulation in the entire system. To be specific, from the output wavelength characteristics (the output spectrums) of the single optical amplifier which are calculated by the above simulation apparatus 1', loss wavelength characteristics considering an influence by the stimulated Raman scattering in the transmission path and the wavelength routing device which are connected to the latter stage of such an optical amplifier is subtracted, so that wavelength characteristics (the input spectrums) of the signal light input to the next stage optical amplifier is derived, and a series of this calculation processing is repetitively executed in successive up to the reception end, thereby simulating the transmission characteristics of the entire system.

FIG. 25 is a diagram showing one example of the above optical transmission system simulation model. In this simulation model, in the case where one unit 20 is made up by a post-amplifier 21, a fiber section 22 corresponding to the transmission path and the dispersion compensation fiber, a pre-amplifier 23 and an OADM section 24 corresponding to the wavelength routing device, and the number of OADM nodes configuring the optical transmission system is n, the output power characteristics $P_{OUT}$ ($\lambda$) of each unit of from a unit 20-1 to a unit 20-$n$ are sequentially calculated, so that the wavelength characteristics of the signal light finally input to a receiver 25 are calculated.

FIG. 26 is a block diagram showing a configuration example of a simulation apparatus corresponding to the optical transmission system to which the simulation model of FIG. 25 is applied.

In FIG. 26, the present simulation apparatus 1" comprises, for example, the input section 11, a storage section 12", the computation section 13 and the output section 14. The input section 11 receives information relating to a configuration of the system which is a simulation objective, and information relating to the wavelength numbers of the signal light transmitted on the system and the wavelength allocation thereof.

The storage section 12" stores therein, together with a simulation program, as a database, the loss wavelength characteristics of the transmission path and the dispersion compensation fiber and power fluctuation amounts due to the stimulated Raman scattering in the transmission path and the dispersion compensation fiber, and field characteristics (for example, transmission wavelength characteristics or loss wavelength characteristics) of each OADM node, in addition to the average gain $G_{AVE}$, the gain deviation $\Delta G$ ($\lambda$), the gain change amount $\Delta G_{GSHB}$ ($\lambda$) due to the gain spectral hole burning phenomenon and the characteristic parameters for the amplification medium, which are similar to those in the above simulation apparatus 1'.

The computation section 13 is made up by a CPU (Central Processing Unit) and the like, and executes the computation processing corresponding to the simulation model shown in FIG. 25, in accordance with the program stored in the storage section 12". The output section 14 outputs the simulation result in the computation section 13 to the outside.

Here, there will be described the computation processing executed by the computation section 13. Similarly to the above described embodiments, the description will be made provided that a state (stationary state) before the changes in the wavelength numbers of the signal light and the wavelength allocation thereof is a first state and a state (failed state) after the changes is a second state.

Figure 30:
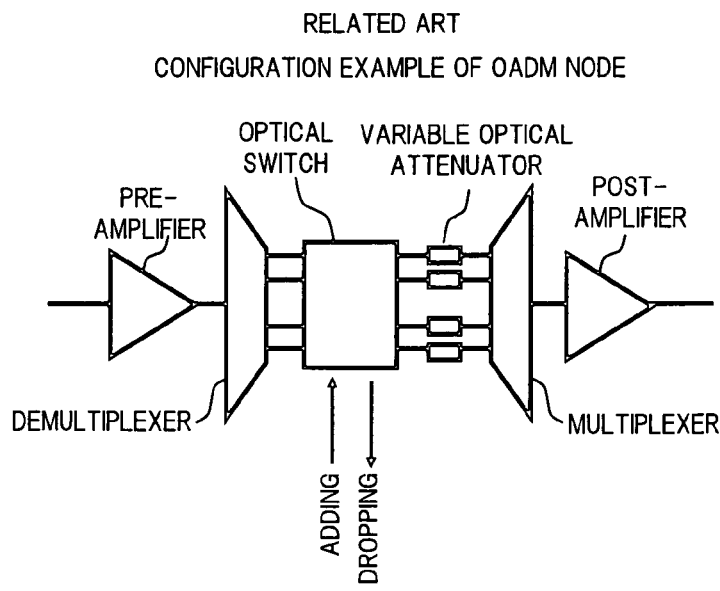
FIG. 30 is a diagram showing a configuration example of a typical OADM node.

Firstly, showing a correspondence relation between the configuration of the WDM optical transmission system shown in FIG. 29 and the simulation model shown in FIG. 25, a post-amplifier (refer to FIG. 30) arranged on an output end of an OADM node #2 into which the signal light of N waves is added in FIG. 29 corresponds to the post-amplifier 21 of the unit 20-1 in FIG. 25. Further, the signal light dropped in an OADM node #n in FIG. 29 corresponds to the signal light input to the receiver 25 in FIG. 25.

In the first stage, to the post-amplifier 21 of the unit 20-1, the signal light of M+N waves is input, and the input spectrums $P_{IN}(\lambda)$ corresponding to the wavelength numbers of the signal light and the wavelength allocation thereof are supplied to the computation section 13 via the input section 11. Similarly to the case in the simulation apparatus 1', the computation section 13 refers to the average gain $G_{AVE}$ and the gain deviation $\Delta G(\lambda)$ which correspond to the post-amplifier 21 from the database of the storage section 12'', and also uses the calculation model shown in the formula (3) or the formula (3)' to calculate the difference value $\Delta G_{GSHB}$ of the gain change amount due to the gain spectral hole burning phenomenon, to thereby calculate the output spectrums of the post-amplifier 21.

Next, the computation section 13 refers to the loss wavelength characteristics in the transmission path subsequent to the post-amplifier 21, and subtracts the loss in the transmission path from the output spectrums of the post-amplifier 21, to thereby calculate the wavelength characteristics of the signal light output from the fiber section 22. At this time, in the case where the power of the signal light input from the post-amplifier 21 to the transmission path is equal to or larger than an occurrence threshold of the stimulated Raman scattering, the output spectrums of the post-amplifier 21 is subtracted by the loss in the transmission path, and also, is added with the power fluctuation amounts due to the stimulated Raman scattering.

The calculation result of the output wavelength characteristics of the fiber section 22 is made to be the input spectrums to the pre-amplifier 23, and the calculation of the output spectrums of the pre-amplifier 23 is executed in the same way as that for the post-amplifier 21. Then, when the output spectrums of the pre-amplifier 23 are calculated, the data relating to the filter characteristics of the latter-stage wavelength routing device is referred to, a loss of each wavelength in the wavelength routing device is obtained based on a relation between an output power level of the pre-amplifier 23 and a set value of an output power level of the wavelength routing device, and the loss wavelength characteristics of the wavelength routing device are subtracted from the output spectrums of the pre-amplifier 23, thereby calculating the output spectrums of the OADM section 24.

When the transmission characteristics in the unit 20-1 are calculated as described in the above, the computation processing similar to the above is repetitively executed in successive on the units 20-2 to 20-n. Then, the output spectrums $P_{OUT}(\lambda)$ from the pre-amplifier 23 of the unit 20-n are calculated as the spectrums of the signal light input to the receiver 25 in the first state.

Next, there is performed the computation processing of the input spectrums to the receiver 25 in the second state after the wavelength numbers of the signal light and the wavelength allocation thereof are significantly changed due to the failure or the like. In the computation processing in the second state, the output spectrums of the post-amplifier 21 of the unit 20-1 are calculated using the input spectrums $P_{IN}(\lambda)$ after the changes in the wavelength numbers and the wavelength allocation, and thereafter, similarly to the computation processing for the first state, the calculation processing of the transmission characteristics is repetitively executed in successive on the units 20-1 to 20-n, so that the output spectrums $P_{OUT}(\lambda)$ from the pre-amplifier 23 of the unit 20-n are calculated as the spectrums of the signal light input to the receiver 25 in the second state.

Then, by obtaining a difference between the input spectrums to the receiver 25 in the first state and those in the second state, a level fluctuation amount of the signal light input to the receiver 25 around the change from the first state to the second state is calculated. Further, in the case where the optical SN ratio fluctuation of the input spectrums to the receiver 25 is calculated, the signal component and the noise component in the input spectrums to the receiver 25 in each of the first state and the second state are separated from each other, to obtain ratios between the signal components and the noise components in the respective states, and a difference between the ratios is obtained so that the optical SN ratio fluctuation is calculated.

As described in the above, according to the simulation apparatus 1'' in the present embodiment, it becomes possible to simulate with high precision the transmission characteristics of the WDM optical transmission system to which automatically gain controlled optical amplifiers are applied.

In the above embodiment, the configuration is such that the output spectrums of the post-amplifier 21 and the pre-amplifier 23 of each unit are calculated using the calculation model similar to that in the simulation apparatus 1'. However, differently from the case where the optical amplification characteristics of the single optical amplifier is simulated, in the simulation of the transmission characteristics of the optical transmission system, since the output power fluctuation in the plural optical amplifiers is accumulated to be transmitted to the latter-stage optical amplifier, it is predicted that the signal light having the power outside of an input dynamic range of the optical amplifier is input to the post-amplifier 21 or the pre-amplifier 23. In order to perform the simulation corresponding to such a case, it is desirable to prepare, in the database, $\Delta G_{GSHB}(\lambda)$ corresponding to a broad input power range which is obtained by extending the input dynamic range of the single optical amplifier.

Further, there is also a possibility that the accumulated amount of noise light (ASE) generated in the optical amplifiers is increased due to the increase of OADM node numbers or the insertion of repeating nodes on the optical transmission system, and accordingly, the gain spectral hole burning phenomenon which occurs due to the accumulated noise light cannot be neglected. In order to perform the simulation corresponding to such a situation, the configuration may be such that, for example, the noise light power integrated in the fixed band-width around the signal light wavelength is contained in the input spectrums to the latter-stage node, and $\Delta GSHB(\lambda)$ obtained according to the power obtained by summing up the signal light power and the noise light power of the fixed region is prepared in the database.

What is claimed is:

1. An optical amplification characteristics simulation apparatus for supplying a pumping light to an amplification medium doped with rare-earth ions of an optical amplifier, and for simulating optical amplification characteristics of said amplification medium which amplifies a signal light input thereto due to a stimulated emission phenomenon of the pumped rare-earth ions to output the amplified signal light, comprising:

an input section that receives information relating to the signal light input to said amplification medium;

a storage section that stores therein information relating to at least characteristics of said amplification medium;

a computation section that uses the input information of said input section and the stored information of said storage section, to calculate gain wavelength characteristics, inclusive of a gain fluctuation portion due to a gain spectral hole burning phenomenon, of said amplification medium in accordance with a previously set calculating formula, and obtains the power of the signal light output from said amplification medium based on said calculated gain wavelength characteristics, to thereby simulate the optical amplification characteristics of said amplification medium; and an output section that outputs the simulation result in said computation section, wherein said calculating formula used in said computation section has a parameter corresponding to the gain fluctuation portion due to the gain spectral hole burning phenomenon, and said parameter is defined with a function obtained by modeling a physical phenomenon in which a population inversion rate is reduced due to the gain spectral hole burning phenomenon, based on that, in an energy level structure of said amplification medium having Stark levels which are split into $J+\frac{1}{2}$ or $2J+1$ relative to the total quantum numbers J due to Coulomb interactions, the spin-orbit interaction and the Stark effect, electron occupation numbers of each Stark level on the end level side are increased.

2. An optical amplification characteristics simulation apparatus according to claim 1, wherein the function defining said parameter corresponds to that the number of holes formed on gain spectrums due to the gain spectral hole burning phenomenon is determined according to the number of combinations of Stark level which is occupied by electrons on the starting level side and each Stark level on the end level side and said holes correspond to the reduction of a gain population inversion rate due to the gain spectral hole burning phenomenon based on an increase of electron occupation numbers in the end level and a decrease of electron occupation numbers in the starting level.

3. An optical amplification characteristics simulation apparatus according to claim 1, wherein the function defining said parameter corresponds to that a part of the rare-earth ions in said amplification medium contributes to the hole forming on gain spectrums due to the gain spectral hole burning phenomenon.

4. An optical amplification characteristics simulation apparatus according to claim 3, wherein the function defining said parameter corresponds to that a ratio of the rare-earth ions contributing to the hole forming among the rare-earth ions in said amplification medium is increased, as the power of the signal light input to said amplification medium becomes higher.

5. An optical amplification characteristics simulation apparatus according to claim 3, wherein the function defining said parameter corresponds to that the total population inversion rate defined by a ratio of the number of rare-earth ions which provide electrons participating in the stimulated emission transition in the starting level, to the total number of rare-earth ions in said amplification medium, becomes higher, a ratio of the rare-earth ions contributing to the hole forming among the rare-earth ions in said amplification medium is increased.

6. An optical amplification characteristics simulation apparatus according to claim 3, wherein the function defining said parameter corresponds to that a ratio of the rare-earth ions contributing to the hole forming among the rare-earth ions in said amplification medium is decreased as the rare-earth ion concentration in said amplification medium is increased.

7. An optical amplification characteristics simulation apparatus according to claim 3, wherein the function defining said parameter corresponds to that, in accordance with the temperature rise in said amplification medium, the hole-width is increased corresponding to an increase in Stark levels in the starting level, which participate in the hole forming in said amplification medium.

8. An optical amplification characteristics simulation apparatus according to claim 3, wherein the function defining said parameter corresponds to that a ratio of the rare-earth ions contributing to the hole forming among the rare-earth ions in said amplification medium depends on a propagation mode of the signal light in said amplification medium.

9. An optical amplification characteristics simulation apparatus according to claim 8, wherein the function defining said parameter corresponds to that the ratio of the rare-earth ions contributing to the hole forming among the rare-earth ions in said amplification medium is increased, as the power of the signal light incident per one rare-earth element in the amplification medium becomes higher.

10. An optical amplification characteristics simulation apparatus according to claim 8, wherein the function defining said parameter corresponds to that the ratio of the rare-earth ions contributing to the hole forming among the rare-earth ions in said amplification medium is increased, as an integral value of the signal light power in a region doped with the rare-earth ions in said amplification medium becomes larger.

11. An optical amplification characteristics simulation apparatus according to claim 1, wherein said input section receives input spectrums containing information relating to wavelength numbers of the signal light input to said amplification medium and the wavelength allocation thereof, and a noise light;

said storage section stores therein, as a database, information relating to a configuration of said optical amplifier and a characteristic parameter for said amplification medium, and also, stores therein a simulation program incorporating therein a calculating formula to be used in said computation section; and said computation section calculates a change amount of the power of the signal light propagated through said amplification medium with a unit length in a longitudinal direction of said amplification medium as a unit, and sequentially executes the computation processing of adding the change amount of the signal light power in said unit length to the signal light power before the change, from a signal light input end of said amplification medium as a starting point up to a signal light output end thereof, to calculate the power of the signal light output from said amplification medium.

12. An optical amplification characteristics simulation apparatus according to claim 1, wherein said optical amplifier is subjected to an automatic gain control for holding a gain constant, irrespectively of wavelength number of the signal light and the wavelength allocation thereof;

said input section receives input spectrums containing information relating to the wavelength numbers of the signal light input to said amplification medium, the wavelength allocation thereof and a noise light;

said storage section stores therein, as a database, an average gain corresponding to a set gain in said automatic gain control, the gain deviation indicating a difference between said average gain and a gain of each wavelength, and a characteristic parameter for said amplification medium, and also, stores therein a simulation program incorporating therein a calculating formula to be used in said computation section; and said computation section applies the function defining said parameter which corresponds to the gain fluctuation portion due to the gain spectral hole burning phenomenon using the characteristic parameter for said amplification medium which is stored in said storage section, to calculate a difference value between a gain change amount due to the gain spectral hole burning phenomenon occurring at the amplification time in reference wavelength numbers and the reference wavelength allocation and a gain change amount due to the gain spectral hole burning phenomenon occurring at the amplification time in previously set wavelength numbers and the previously set wavelength allocation, and further, uses the information input to said input section, said average gain and gain deviation stored in said storage section, and the difference value between the gain change amounts due to said gain spectral hole burning phenomenon, to calculate output spectrums of the signal light output from said amplification medium in the reference wavelength numbers and the reference wavelength allocation and output spectrums of the signal light output from said amplification medium in the previously set wavelength numbers and the previously set wavelength allocation, in accordance with said calculating formula which uses the gain fluctuation amount generated according to a gain working point shift by said automatic gain control as the parameter.

13. An optical amplification characteristics simulation apparatus according to claim 12, wherein said computation section subtracts the calculation value of the output spectrums in the reference wavelength numbers and the reference wavelength allocation from the calculation value of the output spectrums in the previously set wavelength numbers and the previously set wavelength allocation, to calculate a fluctuation amount of the signal light output power around the changes of the wavelength numbers and the wavelength allocation.

14. An optical amplification characteristics simulation apparatus according to claim 12, wherein said computation section subtracts an optical SN ratio obtained using the calculation value of the output spectrums in the reference wavelength numbers and the reference wavelength allocation from an optical SN ratio obtained using the calculation value of the output spectrums in the previously set wavelength numbers and the previously set wavelength allocation, to calculate a variation amount of the optical SN ratio around the changes of the wavelength numbers and the wavelength allocation.

15. An optical amplification characteristics simulation method, for an optical amplifier which supplies a pumping light to an amplification medium doped with rare-earth ions and amplifies a signal light input to said amplification medium due to a stimulated emission phenomenon of the pumped rare-earth ions, to output the amplified signal light, comprising:

using information relating to the signal light input to said optical amplifier and information relating to characteristics of said amplification medium, to calculate gain wavelength characteristics, inclusive of a gain fluctuation portion due to a gain spectral hole burning phenomenon, of said optical amplifier in accordance with a previously set calculating formula, or obtaining a gain change amount due to the gain spectral hole burning phenomenon which occurs at the optical amplification time in previously set wavelength numbers and the previously set wavelength allocation by previously measuring characteristics of the optical amplifier; and calculating optical amplification characteristics of said optical amplifier based on the calculated or obtained gain wavelength characteristics, wherein said calculating formula used for the calculation of the gain wavelength characteristics of said optical amplifier has a parameter corresponding to the gain fluctuation portion due to the gain spectral hole burning phenomenon, and said parameter is defined with a function obtained by modeling a physical phenomenon in which a population inversion rate is reduced due to the gain spectral hole burning phenomenon, based on that, in an energy level structure of said amplification medium having Stark levels which are split into $J+\frac{1}{2}$ or $2J+1$ relative to the total quantum numbers J due to Coulomb interactions, the spin-orbit interaction and the Stark effect, electron occupation numbers of each Stark level on the end level side are increased.

16. A transmission characteristics simulation apparatus for a wavelength division multiplexing optical transmission system in which a plurality of devices each having a wavelength routing function and a plurality of optical amplifiers are arranged on a transmission path, comprising:

an input section that receives information relating to a configuration of said wavelength division multiplexing optical transmission system and information relating to a signal light transmitted through said wavelength division multiplexing optical transmission system;

a storage section that stores therein information relating to characteristics of an amplification medium of each of said optical amplifiers, loss wavelength characteristics relating to said transmission path and filter characteristics of said devices each having the wavelength routing functions;

a computation section that, for the optical amplifier set at a simulation starting point, uses the information input to said input section and the information stored in said storage section to calculate gain wavelength characteristics, inclusive of a gain fluctuation portion due to a gain spectral hole burning phenomenon, of said optical amplifier in accordance with a previously set calculating formula based on the configuration of said optical amplifier or obtains a gain change amount due to the gain spectral hole burning phenomenon which occurs at the amplification time in previously set wavelength numbers and the previously set wavelength allocation by measuring characteristics of said optical amplifier, and after obtaining the power of the signal light output from said optical amplifier based on the calculated or obtained gain wavelength characteristics, repetitively executes a series of computation processing of calculating the power of the signal light input to the next stage optical amplifier according to the loss wavelength characteristics of said transmission path or the filter characteristics of said device having the wavelength routing function, which are connected to the latter stage of said optical amplifier, up to the optical amplifier connected to a reception end, to thereby simulate transmission characteristics of the signal light which reaches the reception end; and an output section that outputs the simulation result of said computation section, wherein said calculating formula used for the calculation of the gain wavelength characteristics of said optical amplifier in said computation section has a parameter corresponding to the gain fluctuation portion due to the gain spectral hole burning phenomenon, and said parameter is defined with a function obtained by modeling a physical phenomenon in which a population inversion rate is reduced due to the gain spectral hole burning phenomenon, based on that, in an energy level structure of said amplification medium having Stark levels which are split into $J+\frac{1}{2}$ or $2J+1$ relative to the total quantum numbers J due to Coulomb interactions, the spin-orbit interaction and the Stark effect, electron occupation numbers of each Stark level on the end level side are increased.

17. A transmission characteristics simulation apparatus according to claim 16, wherein said storage section stores therein information relating to a power fluctuation amount due to the stimulated Raman scattering which occurs on said optical transmission path, and said computation section, in said series of computation processing, when the input power of the signal light to the transmission path connected to the latter stage of said optical amplifier is equal to or larger than an occurrence threshold of the stimulated Raman scattering, calculates the power of the signal light input to the next stage optical amplifier according to the loss wavelength characteristics of said transmission path and the power fluctuation amount due to the stimulated Raman scattering.

* * * * *